US012230206B2

(12) United States Patent
Jung et al.

(10) Patent No.: US 12,230,206 B2
(45) Date of Patent: Feb. 18, 2025

(54) PIXEL CIRCUIT AND DISPLAY DEVICE INCLUDING THE SAME

(71) Applicant: LG Display Co., Ltd., Seoul (KR)

(72) Inventors: Do Young Jung, Paju-si (KR); Byeong Seong So, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/486,864

(22) Filed: Oct. 13, 2023

(65) Prior Publication Data

US 2024/0257744 A1 Aug. 1, 2024

(30) Foreign Application Priority Data

Jan. 31, 2023 (KR) ........................ 10-2023-0012427

(51) Int. Cl.

*G09G 3/3233* (2016.01)
*G09G 3/3258* (2016.01)
*G09G 3/3266* (2016.01)
*G09G 3/3291* (2016.01)

(52) U.S. Cl.

CPC ......... *G09G 3/3233* (2013.01); *G09G 3/3258* (2013.01); *G09G 3/3266* (2013.01); *G09G 3/3291* (2013.01); *G09G 2300/0426* (2013.01); *G09G 2310/0243* (2013.01)

(58) Field of Classification Search

CPC .. G09G 3/3233; G09G 3/3258; G09G 3/3266; G09G 3/3291

See application file for complete search history.

(56) References Cited

U.S. PATENT DOCUMENTS 8,310,417 B2 * 11/2012 Choi .................... G09G 3/3233 345/80
10,049,621 B2 * 8/2018 Hwang .................. G09G 3/325
11,908,377 B2 * 2/2024 In ......................... G09G 3/3208

(Continued)

FOREIGN PATENT DOCUMENTS

KR 10-2018-0003380 A 1/2018
KR 10-2018-0078109 A 7/2018
KR 10-2019-0063625 A 6/2019

*Primary Examiner* — Sardis F Azongha
(74) *Attorney, Agent, or Firm* — Seed IP Law Group LLP

(57) ABSTRACT

A pixel circuit according to an embodiment and a display device including the same are disclosed. The pixel circuit includes a driving element including a driving element including a first electrode connected to a pixel driving voltage line, a gate electrode connected to a first node, and a second electrode connected to a second node, a first switch element configured to supply a data voltage to the first node in response to a first gate signal, a second switch element configured to supply an initialization voltage to the first node in response to a second gate signal, a third switch element configured to supply a reference voltage to a third node in response to a third gate signal, a fourth switch element configured to connect the second node and the third node in response to a fourth gate signal, a first capacitor connected between the first node and the second node, a second capacitor connected between the pixel driving voltage line and the second node, a third capacitor connected between a gate electrode of the second switch element and the second node and a light-emitting element connected between the third node and a low-potential power voltage line.

20 Claims, 22 Drawing Sheets

(56) References Cited

U.S. PATENT DOCUMENTS

| | | | | |
|---|---|---|---|---|
| 2005/0057182 | A1* | 3/2005 | Shibusawa | G09G 3/325<br>315/209 R |
| 2020/0184886 | A1* | 6/2020 | Chun | G09G 3/3291 |

* cited by examiner

PIXEL CIRCUIT AND DISPLAY DEVICE INCLUDING THE SAME

CROSS-REFERENCE TO RELATED APPLICATION

This application claims priority to and the benefit of Korean Patent Application No. 10-2023-0012427, filed on Jan. 31, 2023, the disclosure of which is incorporated herein by reference in its entirety.

BACKGROUND

Technical Field

The present disclosure relates to a pixel circuit and a display device including the same.

Description of Related Art

Display devices includes a liquid crystal display (LCD) device, an electroluminescence display device, a field emission display (FED) device, a plasma display panel (PDP), and the like.

Electroluminescent display devices are divided into inorganic light emitting display devices and organic light emitting display devices according to a material of a light emitting layer. An active-matrix type organic light emitting display device reproduces an input image using a self-emissive element which emits light by itself, for example, an organic light emitting diode (hereinafter referred to as an "OLED"). An organic light emitting display device has advantages in that a response speed is fast and luminous efficiency, luminance, and a viewing angle are large.

Some of display devices, for example, a liquid crystal display device or an organic light emitting display device includes a display panel including a plurality of sub-pixels, a driver outputting a driving signal for driving the display panel, a power supply generating power to be supplied to the display panel or the driver, and the like. The driver includes a gate driver that supplies a scan signal or a gate signal to the display panel, and a data driver that supplies a data signal to the display panel.

In such a display device, when a driving signal such as a scan signal, an EM signal, and a data signal is supplied to a plurality of sub-pixels formed in the display panel, the selected sub-pixel transmits light or emits light directly to thereby display an image.

Each of a plurality of pixels includes a driving element that controls a driving current, which flows to an organic light-emitting diode (OLED) according to a voltage Vgs between a gate electrode and a source electrode. Electrical characteristics of the driving element may deteriorate with the lapse of a driving time and thus may vary for each pixel. Accordingly, an OLED display device compensates for the deterioration of the driving element through an internal compensation technique or an external compensation technique.

Here, the internal compensation technique uses an internal compensation circuit embedded in each of the pixels to sense a threshold voltage Vth of the driving element for each sub-pixel and compensate for a gate-source voltage Vgs of the driving element by as much as the threshold voltage.

The gate-source voltage Vgs of the driving element may affect a gamma curve for grayscale expression, and due to the gamma curve, power consumption may increase and low grayscale expression may be difficult.

BRIEF SUMMARY

The present disclosure is directed to solving all the above-described necessity and problems.

The present disclosure provides a pixel circuit capable of reducing power consumption and easily expressing a low grayscale, and a display device including the same.

It should be noted that objects of the present disclosure are not limited to the above-described objects, and other objects of the present disclosure will be apparent to those skilled in the art from the following descriptions.

A pixel circuit of the present disclosure includes a driving element including a first electrode connected to a pixel driving voltage line, a gate electrode connected to a first node, and a second electrode connected to a second node, a first switch element configured to supply a data voltage to the first node in response to a first gate signal, a second switch element configured to supply an initialization voltage to the first node in response to a second gate signal, a third switch element configured to supply a reference voltage to a third node in response to a third gate signal, a fourth switch element configured to connect the second node and the third node in response to a fourth gate signal, a first capacitor connected between the first node and the second node, a second capacitor connected between the pixel driving voltage line and the second node, a third capacitor connected between a gate electrode of the second switch element and the second node and a light-emitting element connected between the third node and a low-potential power voltage line.

A pixel circuit of the present disclosure includes a driving element including a first electrode connected to a pixel driving voltage line, a gate electrode connected to a first node, and a second electrode connected to a second node, a first switch element configured to supply a data voltage to the first node in response to a first gate signal, a second switch element configured to supply a reference voltage to the first node in response to a second gate signal, a third switch element configured to supply an initialization voltage to a third node in response to a third gate signal, a fourth switch element configured to connect the second node and the third node in response to a fourth gate signal, a first capacitor connected between the first node and the second node, a second capacitor connected between the pixel driving voltage line and the second node, a fourth capacitor connected between the pixel driving voltage line and the first node, and a light-emitting element connected between the third node and a low-potential power voltage line.

A display device of the present disclosure includes a display panel in which a plurality of data lines, a plurality of gate lines intersecting the data lines, a plurality of power lines through which different constant voltages are applied, and a plurality of pixel circuits are disposed, wherein each of the plurality of pixel circuits includes a driving element including a first electrode connected to a pixel driving voltage line, a gate electrode connected to a first node, and a second electrode connected to a second node, a first switch element configured to supply a data voltage to the first node in response to a first gate signal, a second switch element configured to supply a reference voltage to the first node in response to a second gate signal, a third switch element configured to supply an initialization voltage to a third node in response to a third gate signal, a fourth switch element configured to connect the second node and the third node in response to a fourth gate signal, a first capacitor connected between the first node and the second node, a second capacitor connected between the pixel driving voltage line and the second node, a third capacitor connected between a gate electrode of the second switch element and the second node, and a light-emitting element connected between the third node and a low-potential power voltage line.

A display device of the present disclosure includes a display panel in which a plurality of data lines, a plurality of gate lines intersecting the data lines, a plurality of power lines through which different constant voltages are applied, and a plurality of pixel circuits are disposed, wherein each of the plurality of pixel circuits includes a driving element including a first electrode connected to a pixel driving voltage line, a gate electrode connected to a first node, and a second electrode connected to a second node, a first switch element configured to supply a data voltage to the first node in response to a first gate signal, a second switch element configured to supply a reference voltage to the first node in response to a second gate signal, a third switch element configured to supply an initialization voltage to a third node in response to a third gate signal, a fourth switch element configured to connect the second node and the third node in response to a fourth gate signal, a first capacitor connected between the first node and the second node, a second capacitor connected between the pixel driving voltage line and the second node, a fourth capacitor connected between the pixel driving voltage line and the first node, and a light-emitting element connected between the third node and a low-potential power voltage line.

According to the present disclosure, by shifting a gamma curve or lowering a slope thereof by adjusting a voltage applied to each of a gate electrode and a source electrode of a driving element, a data voltage required to output the same luminance can be reduced, so that power consumption can be reduced and improvement of consumer reliability can be expected.

According to the present disclosure, a slope of a gamma curve can be lowered at a low grayscale, so that a low grayscale can be easily expressed, and when the low grayscale is expressed, the possibility of occurrence of spot defects can be lowered.

According to the present disclosure, by varying an initialization voltage in an on-bias stress (OBS) operation, a luminance at a low grayscale can be increased.

According to the present disclosure, by varying a reference voltage in a sensing operation, a range of sensible threshold voltage can be expanded.

The effects of the present disclosure are not limited to the above-mentioned effects, and other effects that are not mentioned will be apparently understood by those skilled in the art from the following description and the appended claims.

BRIEF DESCRIPTION OF THE SEVERAL VIEWS OF THE DRAWINGS

The above and other objects, features, and advantages of the present disclosure will become more apparent to those of ordinary skill in the art by describing exemplary embodiments thereof in detail with reference to the accompanying drawings, in which.

DETAILED DESCRIPTION

Figure 1:
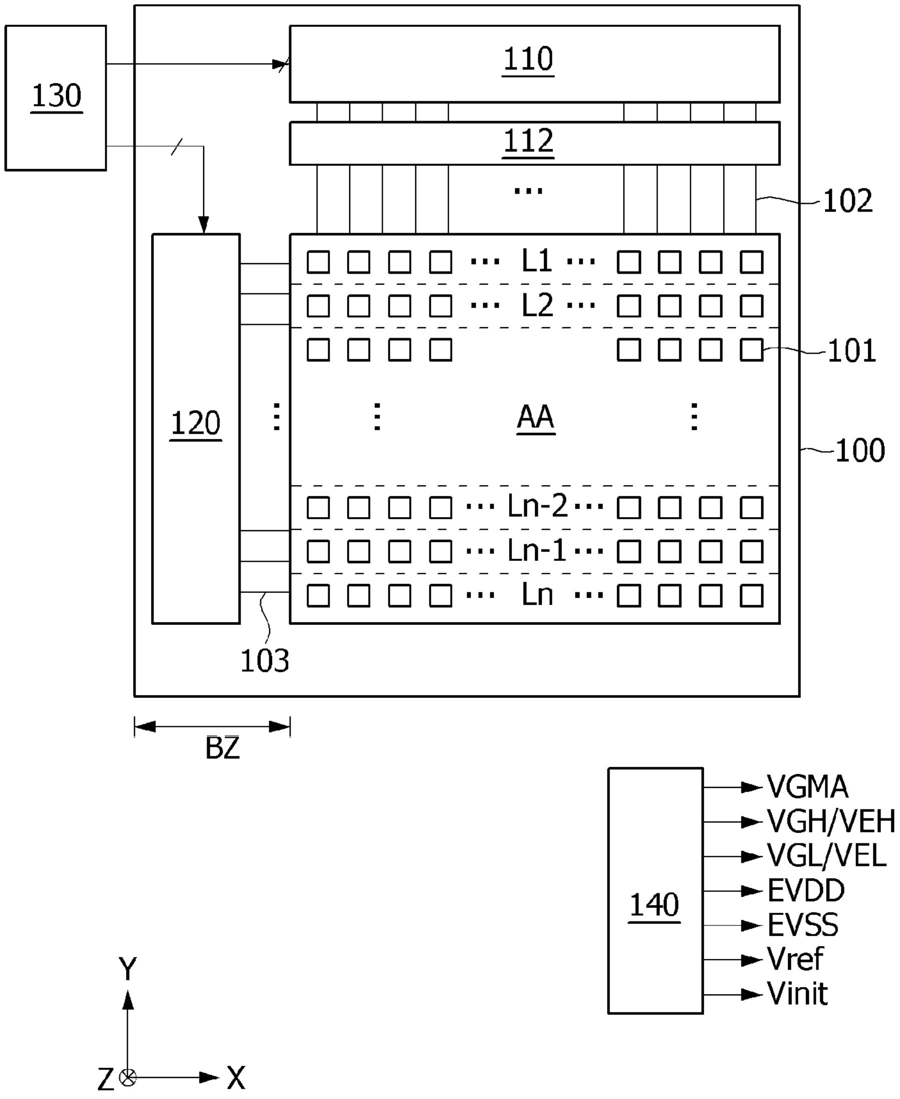
FIG. 1 is a block diagram illustrating a display device according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure.

Shapes, sizes, ratios, angles, numbers, and the like disclosed in the drawings for describing the embodiments of the present disclosure are exemplary, and the present disclosure is not limited to the illustrated items. Same reference numerals refer to same elements throughout. In addition, in describing the present disclosure, if it is determined that the detailed description of the related known technology may unnecessarily obscure the subject matter of the present disclosure, the detailed description thereof will be omitted.

The terms such as “comprising,” “including,” and “having,” used herein are generally intended to allow other components to be added unless the terms are used with the term “only.” Any references to singular may include plural unless expressly stated otherwise.

Components are interpreted to include an ordinary error range even if not expressly stated.

When the position relation between two components is described using the terms such as “on,” “above,” “below,” and “next,” one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The same reference numerals may refer to substantially the same elements throughout the present disclosure.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

Figure 2:
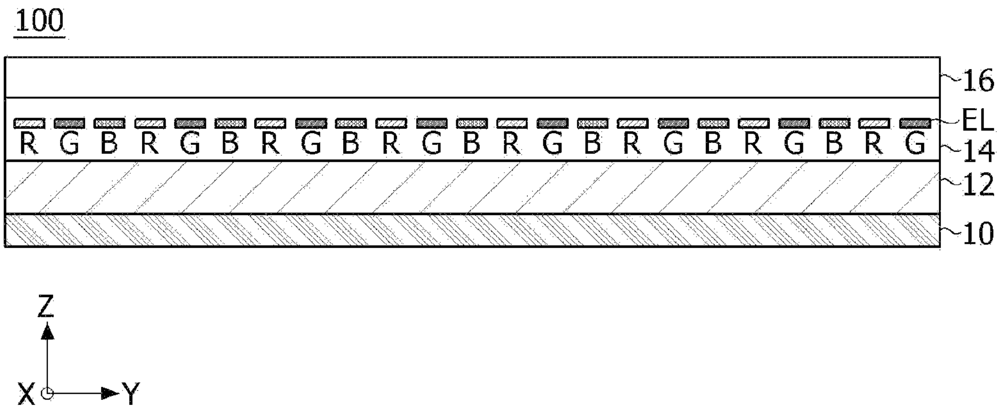
FIG. 2 is a diagram illustrating a cross-sectional structure of a display panel shown in FIG. 1.

FIG. 1 is a block diagram illustrating a display device according to an embodiment of the present disclosure, and FIG. 2 is a diagram illustrating a cross-sectional structure of a display panel shown in FIG. 1.

Referring to FIGS. 1 and 2, a display device according to an embodiment of the present disclosure includes a display panel 100, a display panel driving unit configured to write pixel data to pixels of the display panel 100, and a power supply unit 140 configured to generate power required for driving the pixels and the display panel driving unit.

The display panel 100 may be a display panel with a rectangular-shaped structure having a length in an X-axis direction, a width in a Y-axis direction, and a thickness in a Z-axis direction. The display panel 100 includes a pixel array configured to display an input image on a screen. The pixel array includes a plurality of data lines 102, a plurality of gate lines 103 intersecting the data lines 102, and pixels disposed in a matrix form. The display panel 100 may further include power lines commonly connected to the pixels. The power lines may include a power line through which a pixel driving voltage EVDD is applied, a power line through which an initialization voltage Vinit is applied, a power line through which a reference voltage Vref is applied, and a power line through which a low-potential power voltage EVSS is applied. These power lines are commonly connected to the pixels.

The pixel array includes a plurality of pixel lines L1 to Ln. Each of the pixel lines L1 to Ln includes one line of pixels disposed in a line direction X in the pixel array of the display panel 100. Pixels disposed in one pixel line share the gate lines 103. Pixels disposed in a column direction Y along a data line direction share the same data line 102. One horizontal period 1H is a time obtained by dividing one frame period by the total number of the pixel lines L1 to Ln.

The display panel 100 may be implemented as a non-transmissive display panel or a transmissive display panel. The transmissive display panel is applicable to a transparent display device in which an image is displayed on a screen and a real background object is visible.

The display panel may be manufactured as a flexible display panel. The flexible display panel may be implemented as an organic light-emitting diode (OLED) panel using a plastic substrate. A pixel array and a light-emitting element of the plastic OLED panel may be disposed on an organic thin film adhered to a back plate.

Each of pixels 101 may be divided into a red sub-pixel, a green sub-pixel, and a blue sub-pixel for color implementation. Each of the pixels may further include a white sub-pixel. Each of the sub-pixels includes a pixel circuit. Hereinafter, a pixel may be interpreted as having the same meaning as a sub-pixel. Each of the pixel circuits is connected to the data line, the gate line, and the power line.

The pixels may be disposed as real color pixels or pentile pixels. In the pentile pixel, two sub-pixels of different colors are driven as one pixel 101 using a predetermined pixel rendering algorithm to realize a resolution higher than a resolution of the real-color pixel. The pixel rendering algorithm may compensate for insufficient color representation of each pixel using colors of light emitted from adjacent pixels.

Touch sensors may be disposed on the screen of the display panel 100. The touch sensors may be disposed on the screen of the display panel in an on-cell type or an add-on type, or may be implemented as in-cell type touch sensors embedded in the pixel array AA.

As shown in FIG. 2, the display panel 100 may include a circuit layer 12, a light-emitting element layer 14, and an encapsulation layer 16 stacked on a substrate 10 when viewed from a cross-sectional structure.

The circuit layer 12 may include the pixel circuit connected to wirings such as the data lines, the gate lines, and the power lines, a gate driving unit (gate-in-panel (GIP)) connected to the gate lines, and the like. The wirings and circuit elements of the circuit layer 12 may include a plurality of insulating layers, two or more metal layers separated from each other with the insulating layer therebetween, and an active layer including a semiconductor material.

The light-emitting element layer 14 may include light-emitting elements EL driven by the pixel circuit. The light-emitting elements EL may include a red (R) light-emitting element, a green (G) light-emitting element, and a blue (B) light-emitting element. The light-emitting element layer 14 may include a white light-emitting element and a color filter. The light-emitting elements EL of the light-emitting element layer 14 may be covered by a protective layer including an organic film and a protective film.

The encapsulation layer 16 covers the light-emitting element layer 14 so as to seal the circuit layer 12 and the light-emitting element layer 14. The encapsulation layer 16 may have a multi-insulating film structure in which an organic film and an inorganic film are alternately stacked. The inorganic film blocks the penetration of moisture or oxygen. The organic film planarizes a surface of the inorganic film. When the organic film and the inorganic film are stacked in multiple layers, a moving path of moisture or oxygen becomes longer compared to that of a single layer, and thus, the penetration of moisture and oxygen affecting the light-emitting element layer 14 may be effectively blocked.

A touch sensor layer formed on the encapsulation layer 16 may be disposed. The touch sensor layer may include capacitive touch sensors that sense a touch input based on a change in capacitance before and after the touch input. The touch sensor layer may include metal wiring patterns that form the capacitance of the touch sensors and insulating films. The capacitance of the touch sensor may be formed between the metal wiring patterns. A polarizing plate may be disposed on the touch sensor layer. The polarizing plate may improve visibility and a contrast ratio by converting the polarization of external light reflected by the metals of the touch sensor layer and the circuit layer 12. The polarizing plate may be implemented as a polarizing plate in which a linear polarizing plate and a phase retardation film are bonded, or a circular polarizing plate. A cover glass may be adhered to the polarizing plate.

The display panel 100 may further include the touch sensor layer and a color filter layer stacked on the encapsulation layer 16. The color filter layer may include red, green, and blue color filters, and a black matrix pattern. The color filter layer may absorb a part of a wavelength of light reflected from the circuit layer and the touch sensor layer to replace the role of the polarizing plate, and may increase color purity. In the present embodiment, the color filter layer having a higher transmittance than that of the polarizing plate is applied to the display panel 100 to improve light transmittance, a thickness, and flexibility of the display panel 100. A cover glass may be adhered onto the color filter layer.

The power supply unit 140 generates direct current (DC) power to drive the display panel driving unit and the pixel array of the display panel 100 by using a DC-DC converter. The DC-DC converter may include a charge pump, a regulator, a buck converter, a boost converter, and the like. The power supply unit 140 may adjust a level of an input DC voltage applied from a host system (not shown) to generate constant voltages (or DC voltages) such as a gamma reference voltage VGMA, gate-on voltages VGH and VEH, gate-off voltages VGL and VEL, the pixel driving voltage EVDD, the low-potential power voltage EVSS, the reference voltage Vref, and the initialization voltage Vinit. The gamma reference voltage VGMA is supplied to a data driving unit 110. The gate-on voltages VGH and VEH and the gate-off voltages VGL and VEL are supplied to a gate driving unit 120. The constant voltages such as the pixel driving voltage EVDD, the low-potential power voltage EVSS, the reference voltage Vref, and the initialization voltage Vinit are commonly supplied to the pixels. It is not required that each of the above just listed voltages be constant at all times in all embodiments. In various embodiments, they might each be a constant value at all times or just for a selected period of time and then change to a different DC value at a different time in the circuit operation. In some embodiments, one of more of them might respectively have different values at different times.

The display panel driving unit writes pixel data of an input image to the pixels of the display panel 100 under control of a timing controller (TCON) 130.

The display panel driving unit includes the data driving unit 110 and the gate driving unit 120. The display panel driving unit may further include a demultiplexer array 112 disposed between the data driving unit 110 and the data lines 102.

The demultiplexer array 112 sequentially applies data voltages output from channels of the data driving unit 110 to the data lines 102 using a plurality of demultiplexers (DEMUXs). The demultiplexer may include a plurality of switch elements disposed on the display panel 100. When the demultiplexer is disposed between output terminals of the data driving unit 110 and the data lines 102, the number of the channels of the data driving unit 110 may be reduced. The demultiplexer array 112 may be omitted.

The display panel driving unit may further include a touch sensor driving unit for driving the touch sensors. The touch sensor driving unit is omitted from the drawing. The data driving unit and the touch sensor driving unit may be integrated into one integrated circuit (IC). In a mobile device or a wearable device, the timing controller 130, the power supply unit 140, the data driving unit 110, the touch sensor driving unit, and the like may be integrated into one driver IC.

The display panel driving unit may operate in a low-speed driving mode under control of the timing controller 130. The low-speed driving mode may be set to analyze an input image and reduce power consumption of the display device when there is no change in the input image for a predetermined time. In the low-speed driving mode, when still images are input for a certain time or more, a refresh rate of the pixels may be reduced to reduce power consumption of the display panel driving unit and the display panel 100. The low-speed driving mode is not limited to a case when still images are input. For example, when the display device operates in a standby mode or when a user command or an input image is not input to a display panel driving circuit for a predetermined time or more, the display panel driving circuit may operate in the low-speed driving mode.

The data driving unit 110 converts pixel data of an input image, which is received from the timing controller 130 in the form of a digital signal for each frame period, into a gamma compensation voltage using a digital-to-analog converter (DAC) and outputs a data voltage. The gamma reference voltage VGMA is supplied to the DAC by being divided into a gamma compensation voltage for each grayscale through a voltage divider circuit. The data voltage is output from each channel of the data driving unit 110 through an output buffer.

The gate driving unit 120 may be implemented as a gate-in-panel (GIP) circuit, which is directly formed on the display panel 100, together with a thin-film transistor (TFT) array and wirings of the pixel array. The GIP circuit may be disposed on a bezel area BZ, which is a non-display area of the display panel 100, or may be disposed by being distributed in the pixel array in which an input image is reproduced. The gate driving unit 120 sequentially outputs a gate signal to the gate lines 103 under control of the timing controller 130. The gate driving unit 120 may sequentially supply the gate signal to the gate lines 103 by shifting the gate signal using a shift register. The gate signal may include a scan pulse, a light-emitting control pulse (hereinafter referred to as "EM pulse"), an initialization pulse, and a sensing pulse.

The shift register of the gate driving unit 120 outputs the pulse of the gate signal in response to a start pulse and a shift clock from the timing controller 130, and shifts the pulse in synchronization with a timing of the shift clock.

The timing controller 130 receives digital video data DATA of an input image and timing signals synchronized with the digital video data from the host system. The timing signals may include a vertical synchronization signal Vsync, a horizontal synchronization signal Hsync, a clock CLK, a data enable signal DE, and the like. The vertical synchronization signal Vsync and the horizontal synchronization signal Hsync may be omitted since a vertical period and a horizontal period may be obtained by a method of counting the data enable signal DE. The data enable signal DE has a period of one horizontal period 1H.

The host system may be one of a television system, a tablet computer, a notebook computer, a navigation system, a personal computer (PC), a home theater system, a mobile device, a wearable device, and a vehicle system. The host system may scale an image signal from a video source to match a resolution of the display panel 100 and transmit a resultant image signal and a timing signal to the timing controller 130.

In a normal driving mode, the timing controller 130 may multiply an input frame frequency by i (i is a natural number) and control an operation timing of the display panel driving unit with a frame frequency, which is the input frame frequency×i Hz. The input frame frequency is 60 Hz in the National Television Standards Committee (NTSC) scheme and 50 Hz in the Phase-Alternating Line (PAL) scheme. The timing controller 130 may lower a driving frequency of the display panel driving unit by lowering the frame frequency to a frequency between 1 Hz and 30 Hz in order to lower the refresh rate of the pixels in the low-speed driving mode.

The timing controller 130 may generate a data timing control signal for controlling an operation timing of the data driving unit 110, a control signal for controlling an operation timing of the demultiplexer array 112, and a gate timing control signal for controlling an operation timing of the gate driving unit 120 based on the timing signals Vsync, Hsync, and DE received from the host system. The timing controller 130 controls the operation timing of the display panel driving unit to synchronize the data driving unit 110, the demultiplexer array 112, the touch sensor driving unit, and the gate driving unit 120 therewith.

A voltage level of the gate timing control signal output from the timing controller 130 may be supplied to the gate driving unit 120 by being converted into the gate-on voltages VGH and VEH and the gate-off voltages VGL and VEL through a level shifter (not shown). The level shifter converts a low-level voltage of the gate timing control signal into the gate-off voltages VGL and VEL and converts a high-level voltage of the gate timing control signal into the gate-on voltages VGH and VEH. The gate timing control signal includes a start pulse and a shift clock.

Figure 3:
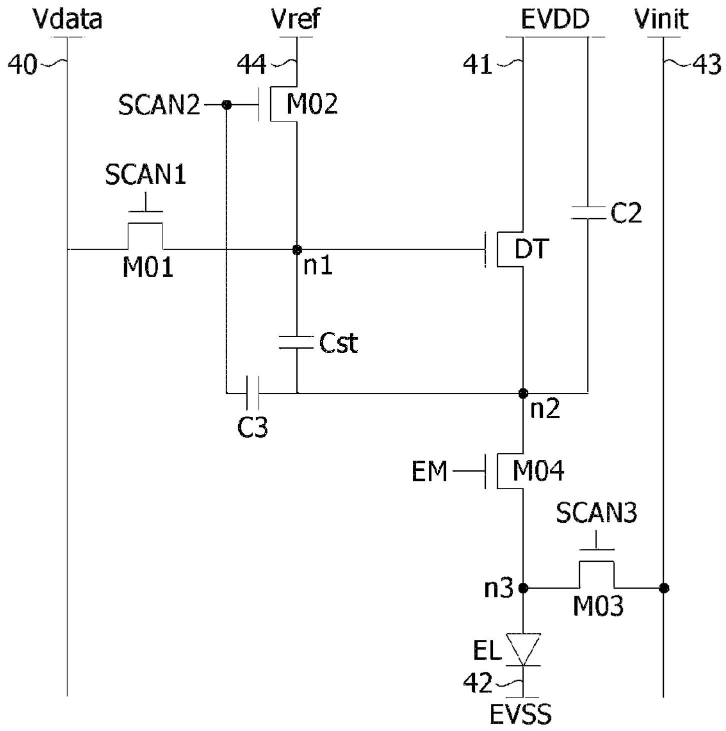
FIG. 3 is a diagram illustrating a pixel circuit according to a first embodiment of the present disclosure.
Figure 4A:
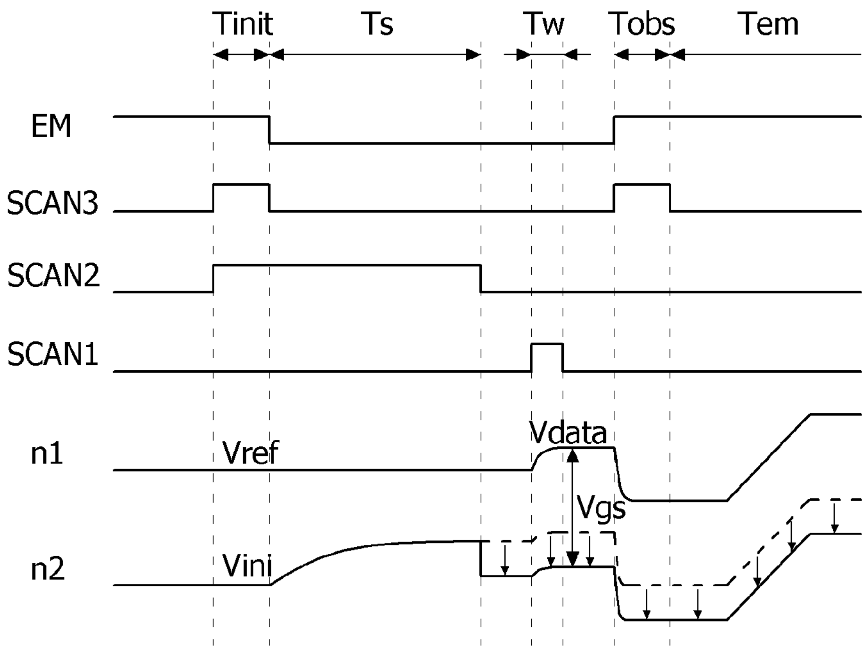
FIGS. 4A and 4B are diagrams illustrating driving timings of the pixel circuit shown in FIG. 3.
Figure 4B:
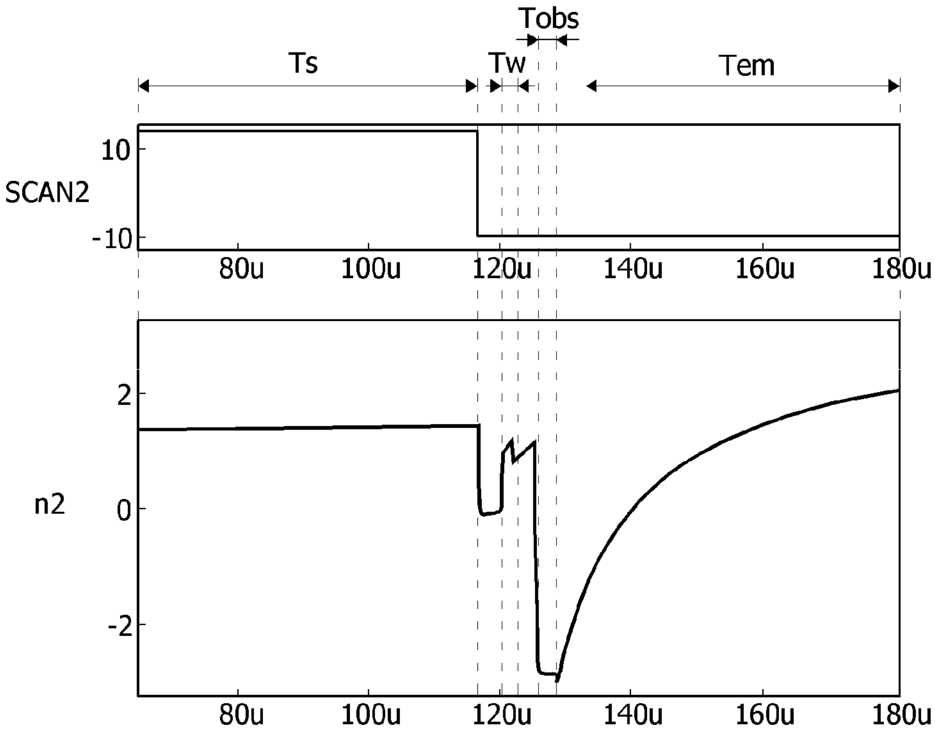
Figure 5:
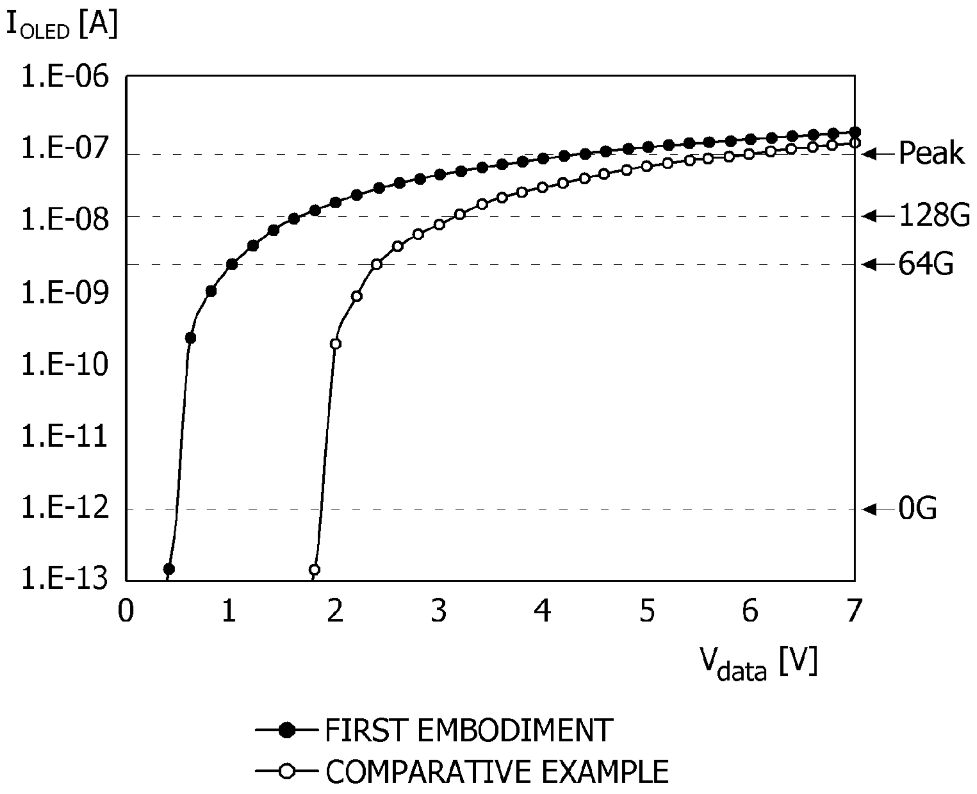
FIG. 5 is a diagram for comparing and describing a gamma curve changed by a third capacitor shown in FIG. 3.

FIG. 3 is a diagram illustrating a pixel circuit according to a first embodiment of the present disclosure, FIGS. 4A and 4B are diagrams illustrating driving timings of the pixel circuit shown in FIG. 3, and FIG. 5 is a diagram for comparing and describing a gamma curve changed by a third capacitor shown in FIG. 3.

Referring to FIG. 3, a pixel circuit according to a first embodiment of the present disclosure includes a light-emitting element EL, a driving element DT configured to supply a current to the light-emitting element EL, a plurality of switch elements M01, M02, M03, and M04 configured to switch current paths connected to the driving element DT, a first capacitor Cst configured to store a gate-source voltage of the driving element DT, a second capacitor C2, and a third capacitor C3. The driving element DT and the switch elements M01, M02, M03, and M04 may be implemented as n-channel oxide TFTs.

The light-emitting element EL emits light by a current applied through a channel of the driving element DT according to a gate-source voltage Vgs of the driving element DT, which varies according to a data voltage Vdata. The light-emitting element EL may be implemented as an OLED including an organic compound layer formed between an anode and a cathode. The organic compound layer may include, but is not limited to, a hole injection layer HIL, a hole transport layer HTL, a light-emitting layer EML, an electron transport layer ETL, an electron injection layer EIL, and the like. The anode of the light-emitting element EL is connected to the driving element DT through a third node n3, and the cathode of the light-emitting element EL is connected to a low-potential power voltage line 42 through which a low-potential power voltage EVSS is applied.

The OLED used as the light-emitting element EL may have a tandem structure in which a plurality of light-emitting layers are stacked. The OLED of the tandem structure can improve the luminance and lifespan of the pixel.

The driving element DT supplies a current to the light-emitting element EL according to the gate-source voltage Vgs thereof to drive the light-emitting element EL. The driving element DT includes a gate electrode connected to a first node n1, a first electrode (or a drain) connected to a pixel driving voltage line 41 through which a pixel driving voltage EVDD is applied, and a second electrode (or a source) connected to a second node n2.

A first switch element M01 is turned on according to a gate-on voltage of a first gate signal SCAN1 and connects a data voltage line 40 to the first node n1 to apply the data voltage. The first switch element M01 includes a gate electrode to which the first gate signal SCAN1 is applied, a first electrode connected to the data voltage line 40 through which the data voltage is applied, and a second electrode connected to the first node n1.

A second switch element M02 is turned on according to a gate-on voltage of a second gate signal SCAN2, and connects a reference voltage line 44 to the first node n1 to apply a reference voltage Vref. The second switch element M02 includes a gate electrode to which the second gate signal SCAN2 is applied, a first electrode connected to the reference voltage line 44 through which the reference voltage is applied, and a second electrode connected to the first node n1.

A third switch element M03 is turned on according to a gate-on voltage of a third gate signal SCAN3, and connects an initialization voltage line 43 to the third node n3 to apply an initialization voltage Vinit. The third switch element M03 includes a gate electrode to which the third gate signal SCAN3 is applied, a first electrode connected to the third node n3, and a second electrode connected to the initialization voltage line 43 through which the initialization voltage Vinit is applied.

A fourth switch element M04 is turned on according to a gate-on voltage of a fourth gate signal EM to connect the second node n2 and the third node n3. The fourth switch element M04 includes a gate electrode to which the fourth gate signal EM is applied, a first electrode connected to the second node n2, and a second electrode connected to the third node n3.

The first capacitor Cst may be connected between the first node n1 and the second node n2. The first capacitor Cst charges the gate-source voltage Vgs of the driving element DT.

The second capacitor C2 may be connected between the second node n2 and the pixel driving voltage line 41.

The third capacitor C3 may be connected between the gate electrode of the second switch element M02 and the second node n2. The third capacitor C3 serves to lower the voltage of the second node n2 by capacitance coupling at the time of falling of the second gate signal.

Referring to FIGS. 4A and 4B, the pixel circuit according to the first embodiment of the present disclosure may operate in the order of an initialization operation Tini, a sensing operation Ts, a data writing operation Tw, an on-bias stress (OBS) operation Tobs, and a light-emitting operation Tem.

That is, the pixel circuit is initialized in the initialization operation Tini. In the sensing operation Ts, a threshold voltage Vth of the driving element DT is sensed and stored in the first capacitor Cst, and the reference voltage Vref is varied to a predetermined level. The second switch element M02 is turned on by the second gate signal SCAN2 in the initialization operation Tinit and the sensing operation Ts.

At this time, as shown in FIG. 4B, the voltage of the second node n2 is lowered at a falling time of the second gate signal SCAN2 by the capacitance coupling of the third capacitor C3, and as a result, Vgs is increased.

In the data writing operation Tw, the first switch element M01 is turned on, and the data voltage Vdata of pixel data is applied to the first node n1. In the OBS operation Tobs, the third switch element M03 and the fourth switch element M04 are turned on, the initialization voltage Vinit is applied to the second node n2, and the initialization voltage Vinit is varied to a predetermined level. In addition, in the light-emitting operation Tem, the voltages of the first node n1 and the second node n2 rise, and then the light-emitting element EL may emit light with a luminance corresponding to a grayscale value of the pixel data.

Referring to FIG. 5, in the first embodiment, since the gate-source voltage Vgs of the driving element DT increases, a current $I_{OLED}$ flowing through the driving element DT increases.

When a gamma curve in a case, in which the pixel circuit to which the third capacitor is added is used as in the first embodiment, is compared with a gamma curve in a case, in which a pixel circuit to which the third capacitor is not added is used as in a comparative example, it can be seen that the data voltage required for expressing the same grayscale is lowered.

Figure 6:
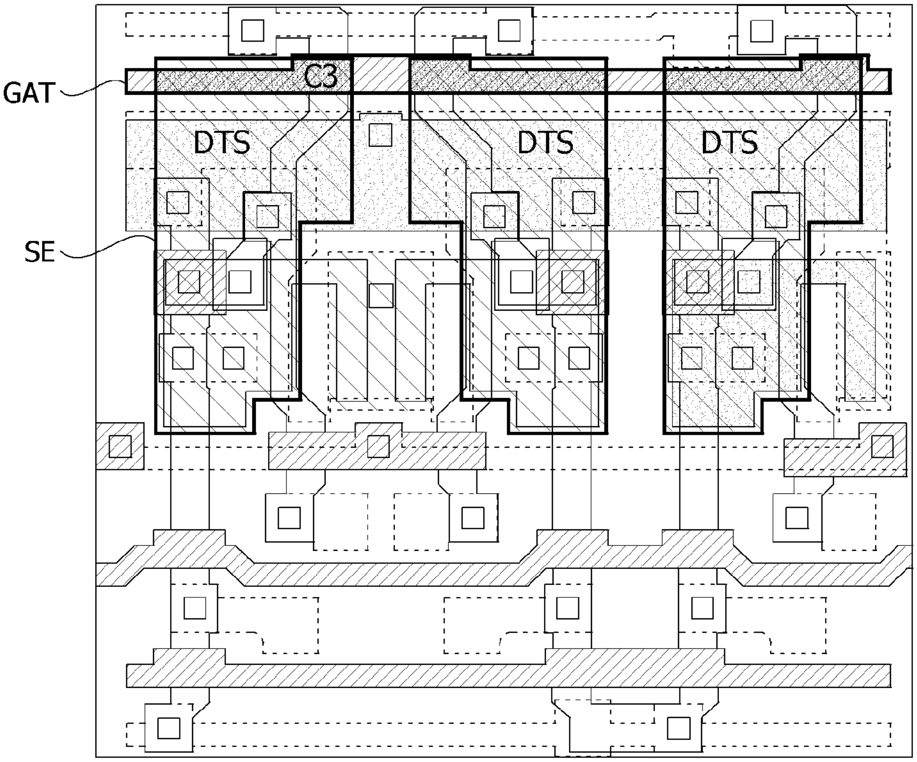
FIG. 6 is a diagram for describing the third capacitor added to the pixel circuit shown in FIG. 3.
Figure 7:
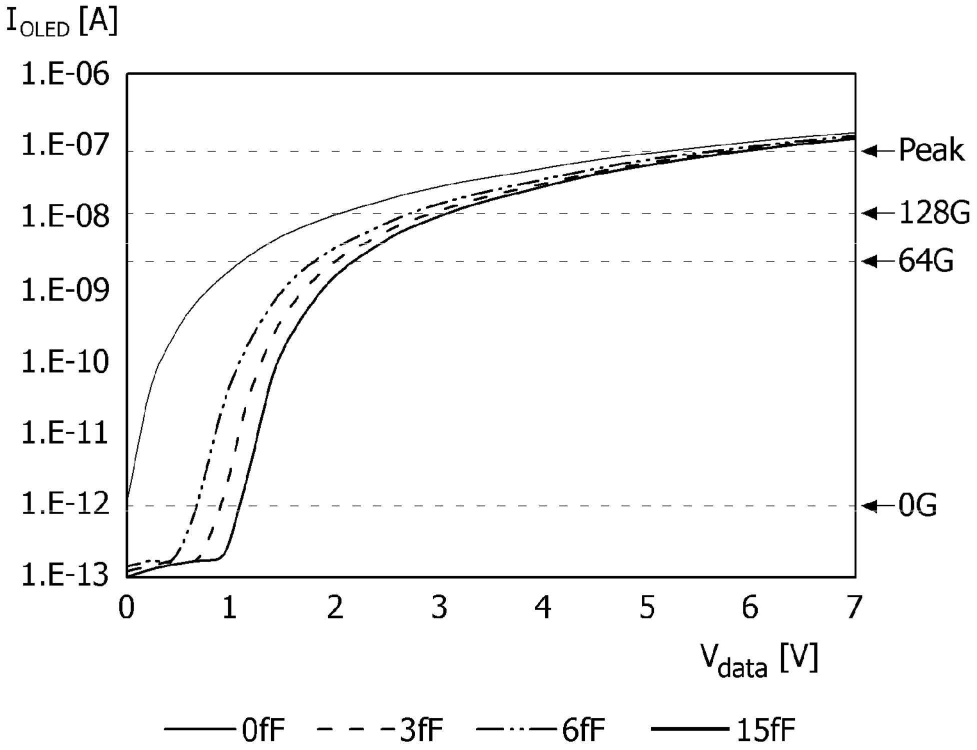
FIG. 7 is a diagram illustrating a gamma curve according to a capacitance of the third capacitor shown in FIG. 3.

FIG. 6 is a diagram for describing the third capacitor added to the pixel circuit shown in FIG. 3, and FIG. 7 is a diagram illustrating a gamma curve according to a capacitance of the third capacitor shown in FIG. 3.

Referring to FIG. 6, in the pixel circuit connected to a compensation circuit, the gate electrode GAT and the source electrode SE of the driving element DT are designed with a large area to form the first capacitor Cst, and in the first embodiment, a portion of the gate electrode of the driving element DT is designed to overlap the gate electrode of the second switch element M02, to which the second gate signal SCAN2 is applied, to form the third capacitor C3.

Referring to FIG. 7, changes in the gamma curve according to the capacitance of the third capacitor C3 are shown. Here, the gamma curves are gamma curves when the capacitances of the third capacitor C3 are 0 femtofarad (fF), 3 fF, 6 fF, and 15 fF, respectively.

At this time, it can be seen that the gamma curves are shifted to the left as the capacitance of the third capacitor C3 becomes larger. That is, it can be seen that the gamma curve is shifted to the left in proportion to the capacitance of the third capacitor C3 so that the data voltage required for expressing the same grayscale is lowered.

For example, it can be seen that, in the gamma curve in the case in which the capacitance of the third capacitor C3 is 0 fF and the gamma curve in the case in which the capacitance of the third capacitor C3 is 15 fF, in order to express a 64 grayscale (64 G), the data voltage is lowered by approximately 1 V or more.

As such, when the gamma curve is shifted to the left as in the first embodiment, the data voltage required for expressing the same grayscale may be relatively lowered, which not only reduces power consumption but also improves consumer confidence.

Figure 8:
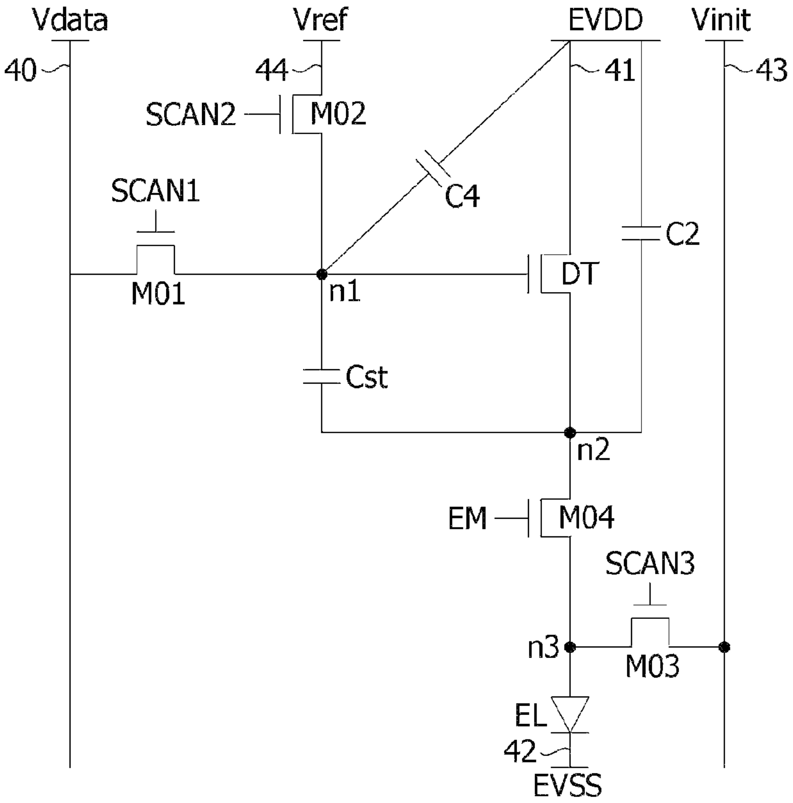
FIG. 8 is a diagram illustrating a pixel circuit according to a second embodiment of the present disclosure.
Figure 9A:
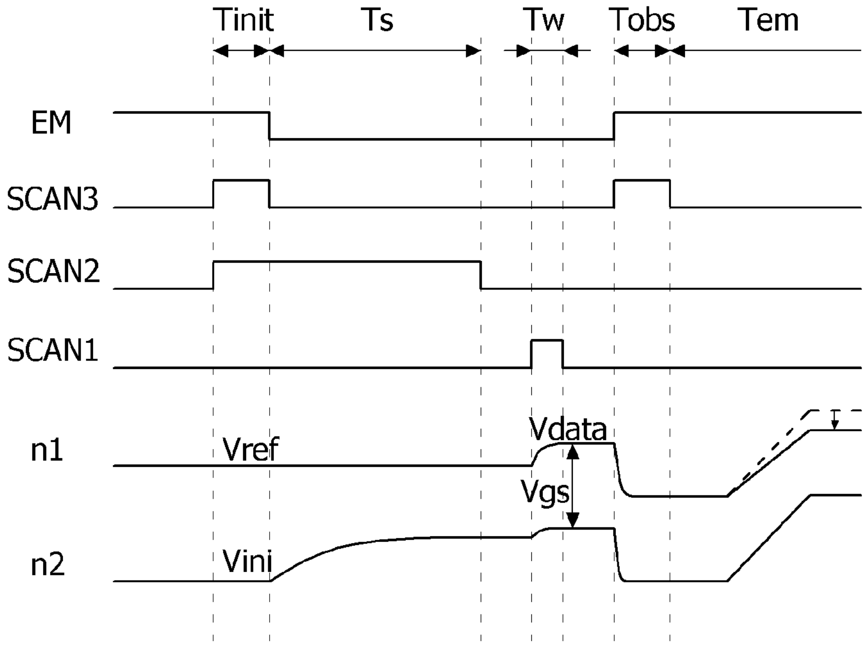
FIGS. 9A and 9B are diagrams illustrating driving timings of the pixel circuit shown in FIG. 8.
Figure 9B:
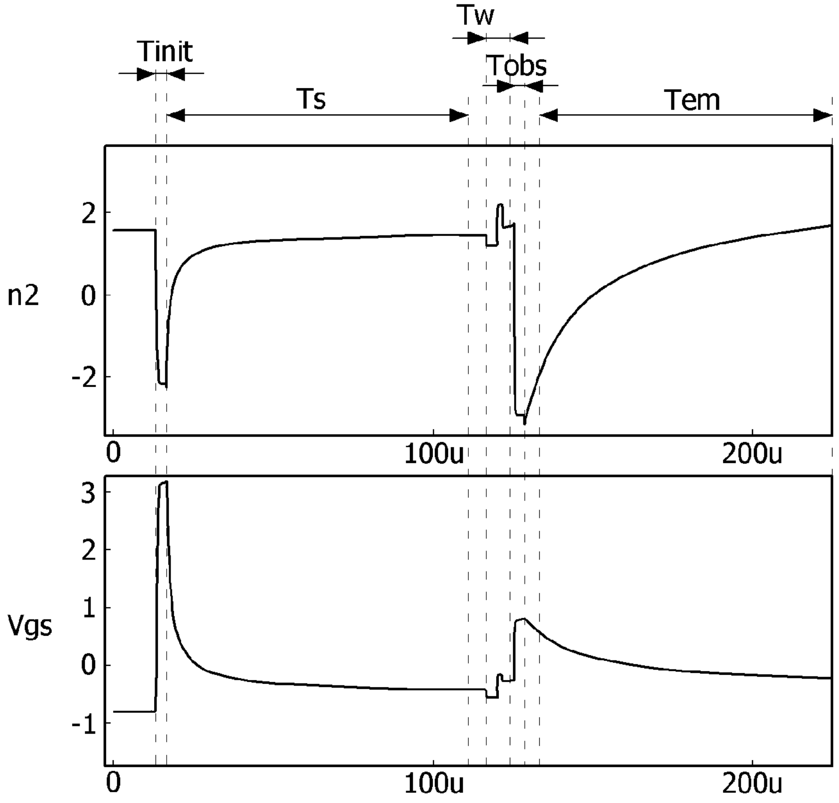
Figure 10:
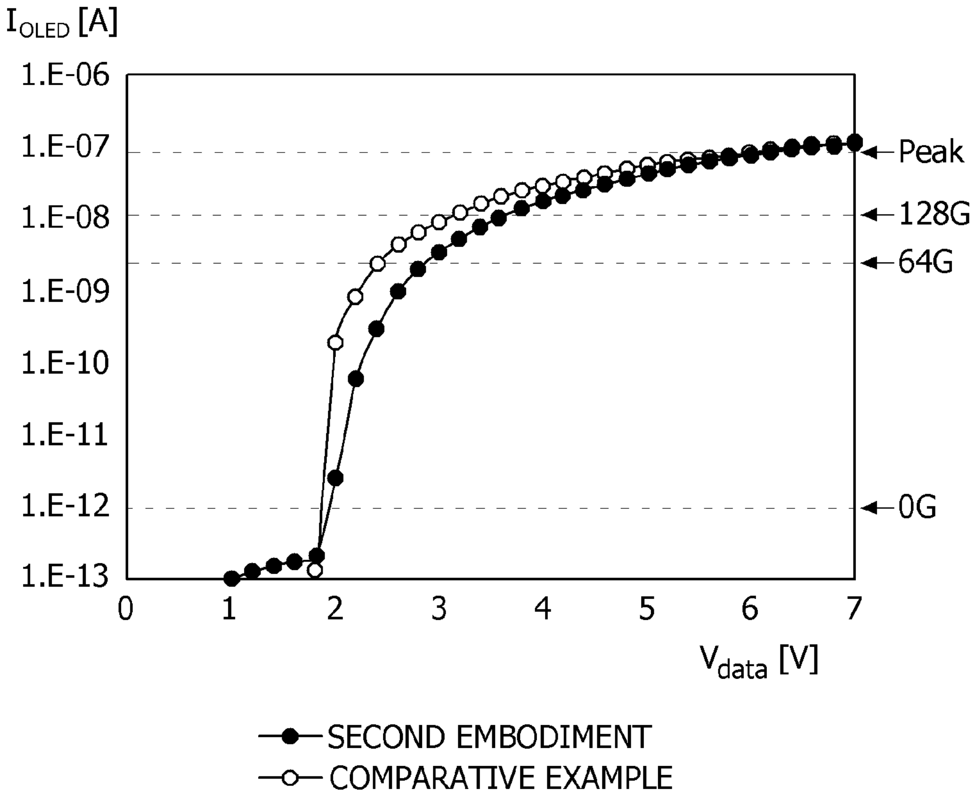
FIG. 10 is a diagram for comparing and describing a gamma curve changed by a fourth capacitor shown in FIG. 8.

FIG. 8 is a diagram illustrating a pixel circuit according to a second embodiment of the present disclosure, FIGS. 9A and 9B are diagrams illustrating driving timings of the pixel circuit shown in FIG. 8, and FIG. 10 is a diagram for comparing and describing a gamma curve changed by a fourth capacitor shown in FIG. 8.

Referring to FIG. 8, a pixel circuit according to a second embodiment of the present disclosure includes a light-emitting element EL, a driving element DT configured to supply a current to the light-emitting element EL, a plurality of switch elements M01, M02, M03, and M04 configured to switch current paths connected to the driving element DT, a first capacitor Cst configured to store a gate-source voltage of the driving element DT, a second capacitor C2, and a fourth capacitor C4. The driving element DT and the switch elements M01, M02, M03, and M04 may be implemented as n-channel oxide TFTs.

The light-emitting element EL emits light by a current applied through a channel of the driving element DT according to a gate-source voltage Vgs of the driving element DT, which varies according to a data voltage Vdata. The light-emitting element EL may be implemented as an OLED including an organic compound layer formed between an anode and a cathode. The organic compound layer may include, but is not limited to, a hole injection layer HIL, a hole transport layer HTL, a light-emitting layer EML, an electron transport layer ETL, an electron injection layer EIL, and the like. The anode of the light-emitting element EL is connected to the driving element DT through a third node n3, and the cathode of the light-emitting element EL is connected to low-potential power voltage line 42 through which a low-potential power voltage EVSS is applied.

The driving element DT supplies a current to the light-emitting element EL according to the gate-source voltage Vgs thereof to drive the light-emitting element EL. The driving element DT includes a gate electrode connected to a first node n1, a first electrode (or a drain) connected to a pixel driving voltage line 41 through which a pixel driving voltage EVDD is applied, and a second electrode (or a source) connected to a second node n2.

A first switch element M01 is turned on according to a gate-on voltage of a first gate signal SCAN1 and connects a data voltage line 40 to the first node n1 to apply the data voltage. The first switch element M01 includes a gate electrode to which the first gate signal SCAN1 is applied, a first electrode connected to the data voltage line 40 through which the data voltage is applied, and a second electrode connected to the first node n1.

A second switch element M02 is turned on according to a gate-on voltage of a second gate signal SCAN2, and connects a reference voltage line 44 to the first node n1 to apply a reference voltage Vref. The second switch element M02 includes a gate electrode to which the second gate signal SCAN2 is applied, a first electrode connected to the reference voltage line 44 through which the reference voltage is applied, and a second electrode connected to the first node n1.

A third switch element M03 is turned on according to a gate-on voltage of a third gate signal SCAN3, and connects an initialization voltage line 43 to the third node n3 to apply an initialization voltage Vinit. The third switch element M03 includes a gate electrode to which the third gate signal SCAN3 is applied, a first electrode connected to the third node n3, and a second electrode connected to the initialization voltage line 43 through which the initialization voltage is applied.

A fourth switch element M04 is turned on according to a gate-on voltage of a fourth gate signal EM to connect the second node n2 and the third node n3. The fourth switch element M04 includes a gate electrode to which the fourth gate signal EM is applied, a first electrode connected to the second node n2, and a second electrode connected to the third node n3.

The first capacitor Cst may be connected between the first node n1 and the second node n2. The first capacitor Cst charges the gate-source voltage Vgs of the driving element DT.

The second capacitor C2 may be connected between the second node n2 and the pixel driving voltage line 41.

The fourth capacitor C4 may be connected between the pixel driving voltage line 41 through which the pixel driving voltage EVDD is applied and the first node n1. The fourth capacitor C4 serves to reduce a voltage rise of the first node n1 during a light-emitting operation according to the principle of voltage distribution with the first capacitor Cst.

Referring to FIGS. 9A and 9B, the pixel circuit according to the second embodiment of the present disclosure may operate in the order of an initialization operation Tini, a sensing operation Ts, a data writing operation Tw, an OBS operation Tobs, and a light-emitting operation Tem.

That is, the pixel circuit is initialized in the initialization operation Tini. In the sensing operation Ts, a threshold voltage Vth of the driving element DT is sensed and stored in the first capacitor Cst.

In the data writing operation Tw, the data voltage Vdata of pixel data is applied to the first node n1. In the OBS operation Tobs, the initialization voltage Vinit is applied to the second node n2. In addition, in the light-emitting operation Tem, the voltages of the first node n1 and the second node n2 rise, and then the light-emitting element EL may emit light with a luminance corresponding to a grayscale value of the pixel data.

At this time, as shown in FIG. 9B, in the light-emitting operation Tem, the second node n2 receives a current due to the pixel driving voltage and gradually rises in voltage, but in the first node n1, the voltage rise is reduced according to the principle of voltage distribution of the fourth capacitor C4 and the first capacitor Cst, which causes Vgs to be reduced.

In more detail, in the light-emitting operation Tem, the voltage of the second node n2 drops to the initialization voltage Vinit and then gradually rises by receiving a current due to the pixel driving voltage.

When the fourth capacitor C4 is not present, the voltage of the first node n1 rises by as much as an increased voltage $\Delta V$ of the second node n2 due to the characteristic that the first capacitor Cst maintains the charge amount.

When the fourth capacitor C4 is present, the voltage will rise only by as much as $(Cst/(Cst+C3))\times\Delta V$ according to the principle of voltage distribution of the fourth capacitor C4 and the first capacitor Cst, which causes Vgs to be reduced.

Referring to FIG. 10, in the second embodiment, since the gate-source voltage Vgs of the driving element DT is reduced, a current $I_{OLED}$ flowing through the driving element DT is reduced.

When a gamma curve in a case, in which the pixel circuit to which the fourth capacitor is added is used as in the second embodiment, is compared with a gamma curve in a case, in which a pixel circuit to which the fourth capacitor is not added is used as in a comparative example, it can be seen that a slope of the gamma curve is reduced in a low grayscale.

When the slope of the gamma curve is reduced in the low grayscale, the low grayscale expression may be facilitated.

Figure 11:
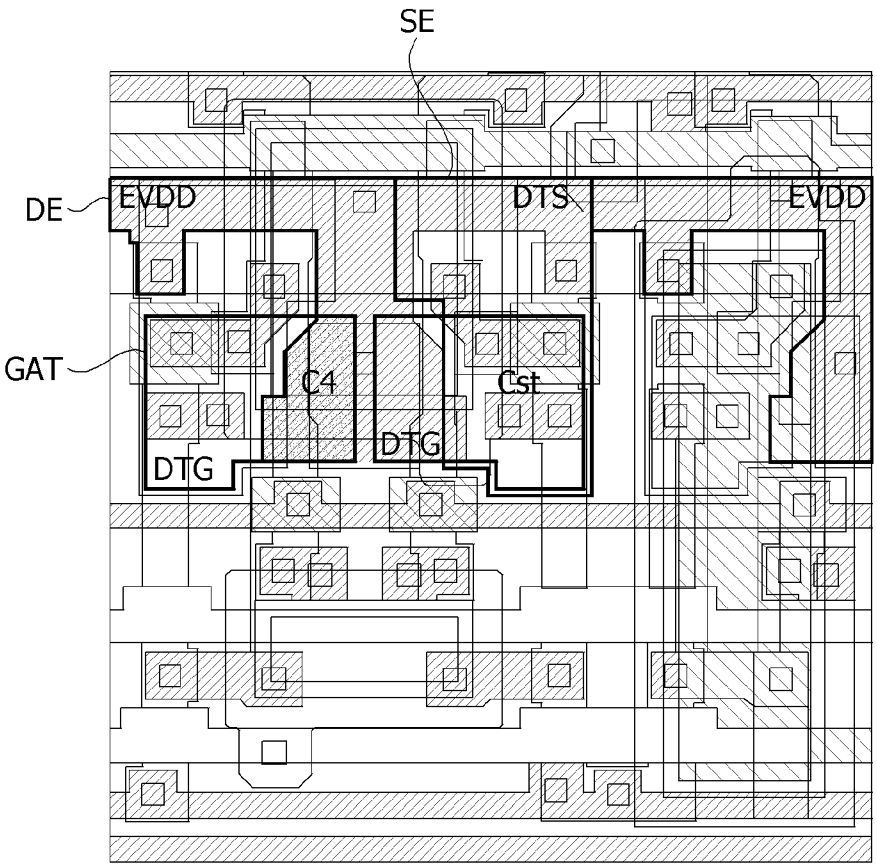
FIG. 11 is a diagram for describing the fourth capacitor added to the pixel circuit shown in FIG. 8.
Figure 12:
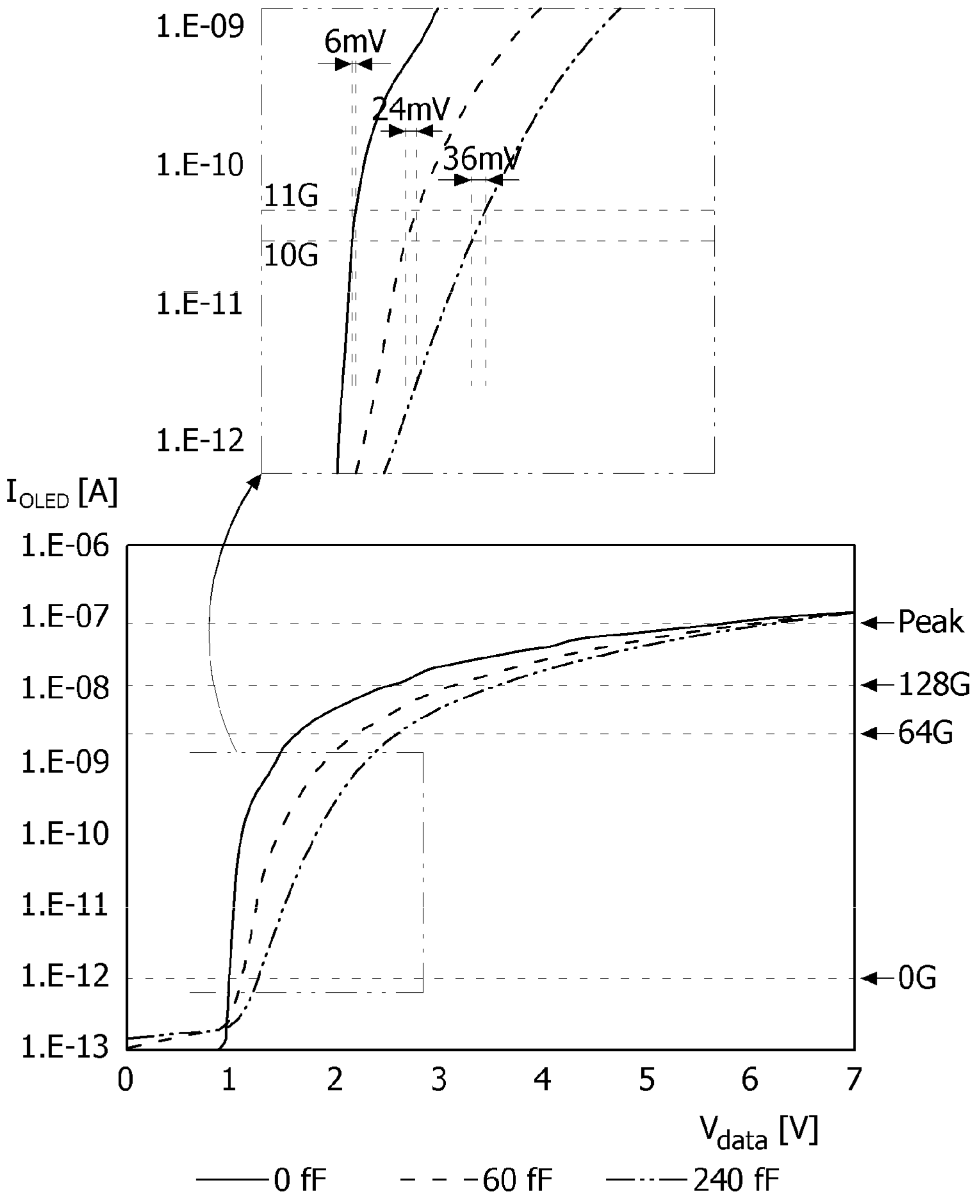
FIG. 12 is a diagram illustrating a gamma curve according to a capacitance of the fourth capacitor shown in FIG. 8.

FIG. 11 is a diagram for describing the fourth capacitor added to the pixel circuit shown in FIG. 8, and FIG. 12 is a diagram illustrating a gamma curve according to a capacitance of the fourth capacitor shown in FIG. 8.

Referring to FIG. 11, in the pixel circuit connected to a compensation circuit, in order to form the first capacitor Cst, the gate electrode GAT and the source electrode SE of the driving element DT are designed with a large area, and the first capacitor Cst is formed by overlapping the gate electrode GAT and the source electrode SE, and in the second embodiment, a portion of the gate electrode GAT of the driving element DT is designed to overlap the drain electrode DE of the driving element DT, to which the pixel driving voltage is applied, to form the fourth capacitor C4.

Referring to FIG. 12, changes in the gamma curve according to the capacitance of the fourth capacitor C4 are shown. Here, the gamma curves are gamma curves when the capacitances of the fourth capacitor C4 are 0 fF, 60 fF, and 240 fF, respectively.

At this time, it can be seen that the slope of the gamma curve decreases as the capacitance of the fourth capacitor C4 increases. That is, it can be seen that the slope of the gamma curve decreases in proportion to the capacitance of the fourth capacitor C4, which increases a data range at a low grayscale.

For example, a voltage difference between a 10 grayscale and an 11 grayscale is only 6 mV when the fourth capacitor C4 has a capacitance of 0 fF, but increases to 24 mV when the fourth capacitor C4 has a capacitance of 60 fF and increases to 36 mV when the fourth capacitor C4 has a capacitance of 240 fF.

In more detail, due to the gamma curve characteristics of a typical OLED display device, the gamma curve is steeply distributed at a low grayscale below a 128 grayscale, which is highly likely to be observed in the shape of a spot when expressing a low grayscale. Accordingly, as in the second embodiment, when the slope of the gamma curve is lowered in a low grayscale, an interval of the data voltages may be increased, so that grayscales may be more accurately expressed and the possibility of occurrence of spot defects may be reduced.

Figure 13:
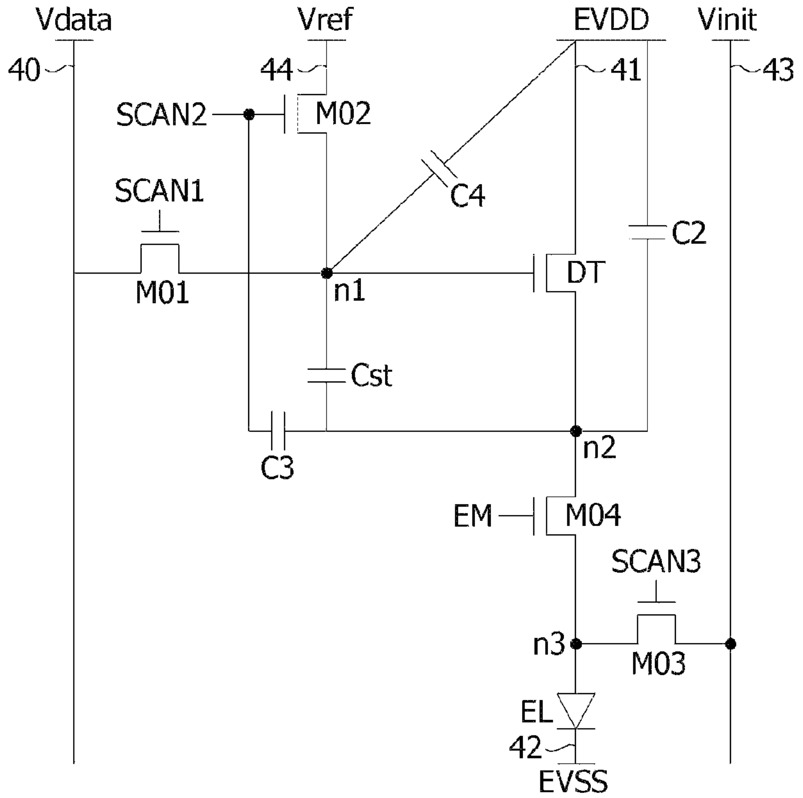
FIG. 13 is a diagram illustrating a pixel circuit according to a third embodiment of the present disclosure.
Figure 14:
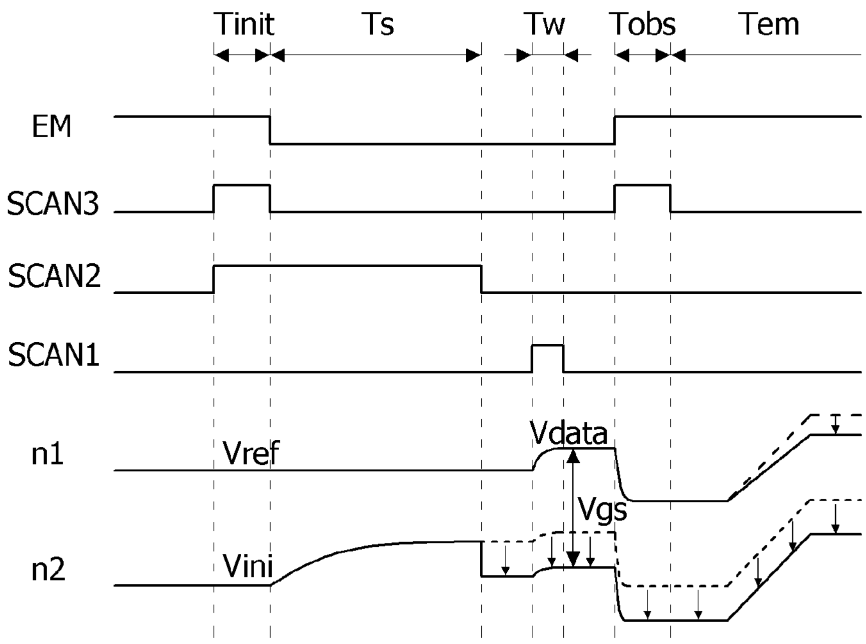
FIG. 14 is a diagram illustrating driving timings of the pixel circuit shown FIG. 13.
Figure 15:
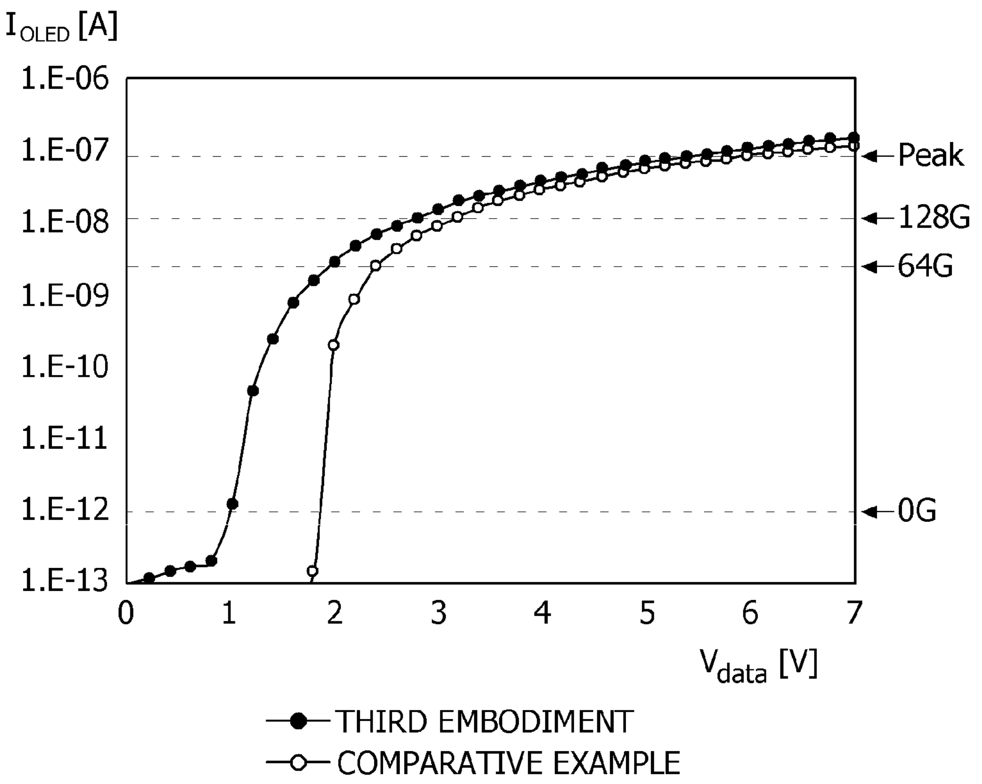
FIG. 15 is a diagram for comparing and describing a gamma curve changed by third and fourth capacitors shown in FIG. 13.

FIG. 13 is a diagram illustrating a pixel circuit according to a third embodiment of the present disclosure, FIG. 14 is a diagram illustrating driving timings of the pixel circuit shown FIG. 13, and FIG. 15 is a diagram for comparing and describing a gamma curve changed by third and fourth capacitors shown in FIG. 13.

Referring to FIG. 13, a pixel circuit according to a third embodiment of the present disclosure includes a light-emitting element EL, a driving element DT configured to supply a current to the light-emitting element EL, a plurality of switch elements M01, M02, M03, and M04 configured to switch current paths connected to the driving element DT, a first capacitor Cst configured to store a gate-source voltage of the driving element DT, a second capacitor C2, a third capacitor C3, and a fourth capacitor C4. The driving element DT and the switch elements M01, M02, M03, and M04 may be implemented as n-channel TFTs.

The third embodiment has a configuration that includes both the configuration of the third capacitor of the first embodiment and the configuration of the fourth capacitor of the second embodiment, and a detailed description thereof will be omitted since the configurations and functions are all the same.

Referring to FIG. 14, the pixel circuit according to the third embodiment of the present disclosure may operate in the order of an initialization operation Tini, a sensing operation Ts, a data writing operation Tw, an OBS operation Tobs, and a light-emitting operation Tem.

That is, a pixel circuit is initialized in the initialization operation Tini. In the sensing operation Ts, a threshold voltage Vth of the driving element DT is sensed and stored in the first capacitor Cst.

At this time, a voltage of a second node n2 is lowered at a falling time of a second gate signal SCAN2 by capacitance coupling of the third capacitor C3, and as a result, Vgs is increased.

In the data writing operation Tw, a data voltage Vdata of pixel data is applied to a first node n1. In the OBS operation Tobs, an initialization voltage Vinit is applied to the second node n2. In addition, in the light-emitting operation Tem, the voltages of the first node n1 and the second node n2 rise, and then the light-emitting element EL may emit light with a luminance corresponding to a grayscale value of the pixel data.

At this time, in the light-emitting operation Tem, the second node n2 receives a current due to a pixel driving voltage and gradually rises in voltage, but in the first node n1, the voltage rise is reduced according to the principle of voltage distribution of the fourth capacitor C4 and the first capacitor Cst, which causes Vgs to be reduced.

Referring to FIG. 15, in the third embodiment, since a gate-source voltage Vgs of the driving element DT is reduced, a current $I_{OLED}$ flowing through the driving element DT is reduced.

When a gamma curve in a case, in which the pixel circuit to which the third and fourth capacitors are added is used as in the third embodiment, is compared with a gamma curve in a case, in which a pixel circuit to which the third and fourth capacitors are not added is used as in a comparative example, it can be seen that the gamma curve is shifted to the left and a slope thereof is reduced. That is, in the third embodiment, the gamma curve is shifted to the left by the third capacitor, and the slope of the gamma curve is reduced by the fourth capacitor.

Figure 16A:
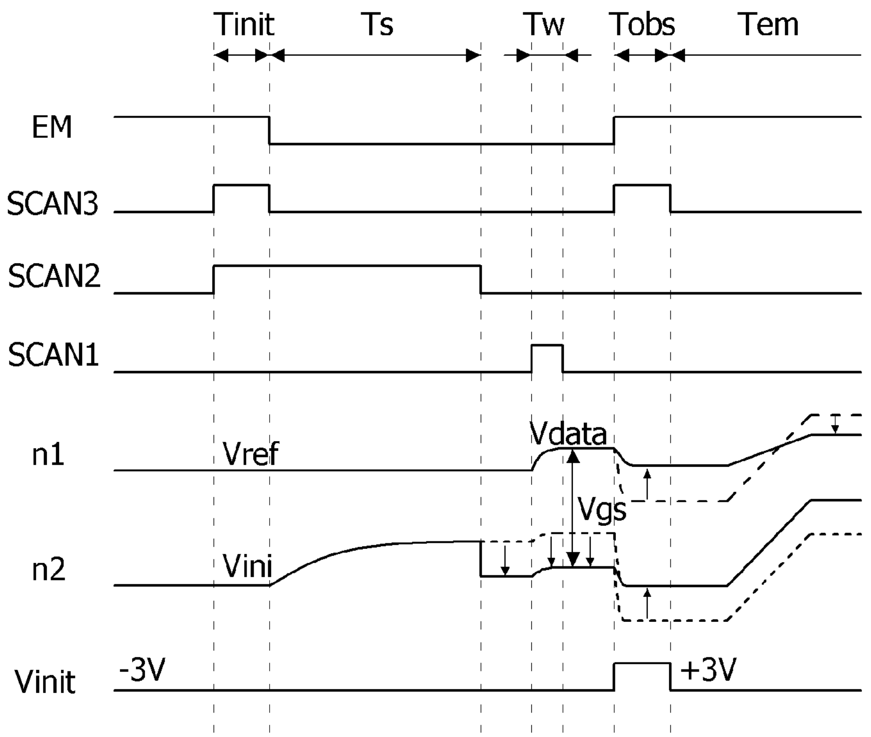
FIGS. 16A and 16B are diagrams illustrating other driving timings of the pixel circuit shown in FIG. 13.
Figure 16B:
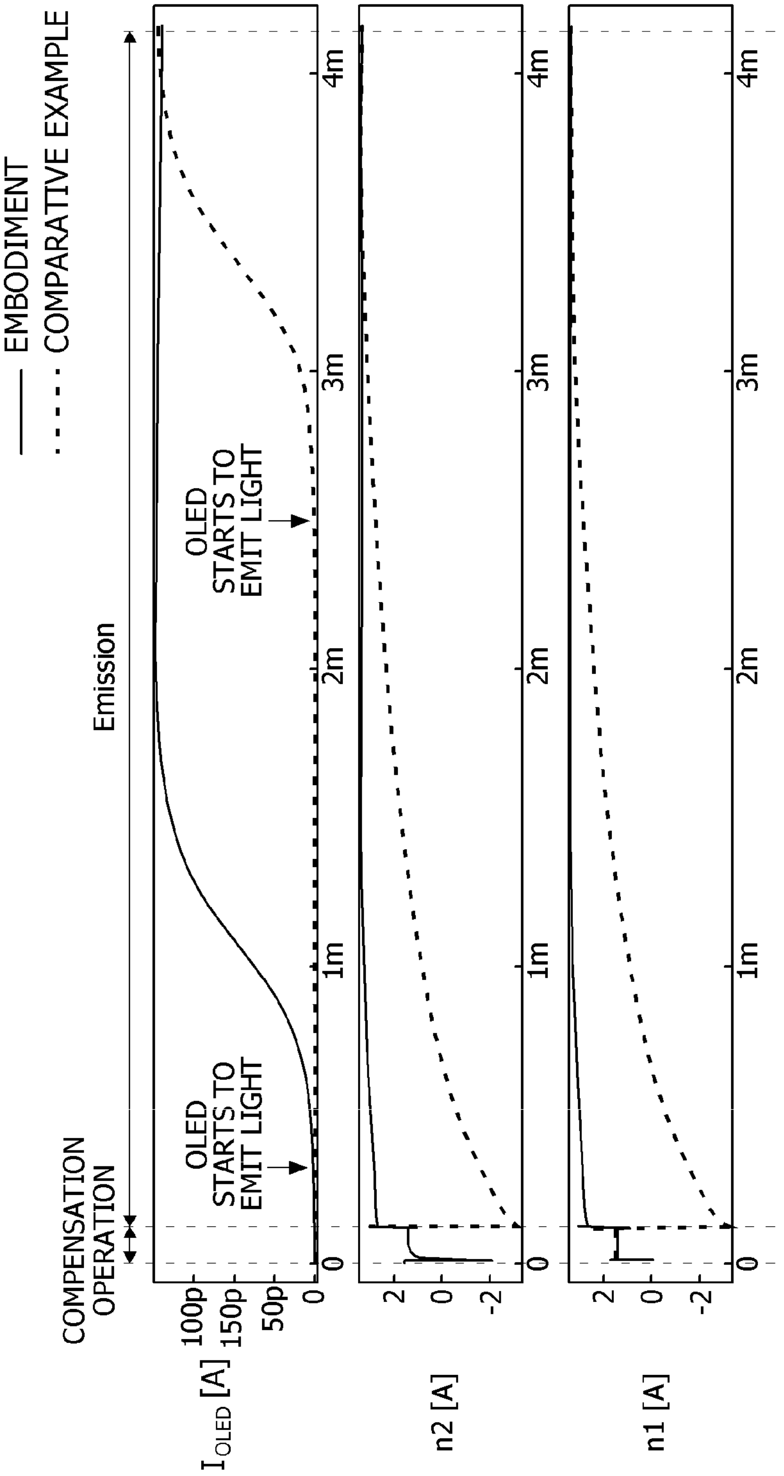
Figure 17:
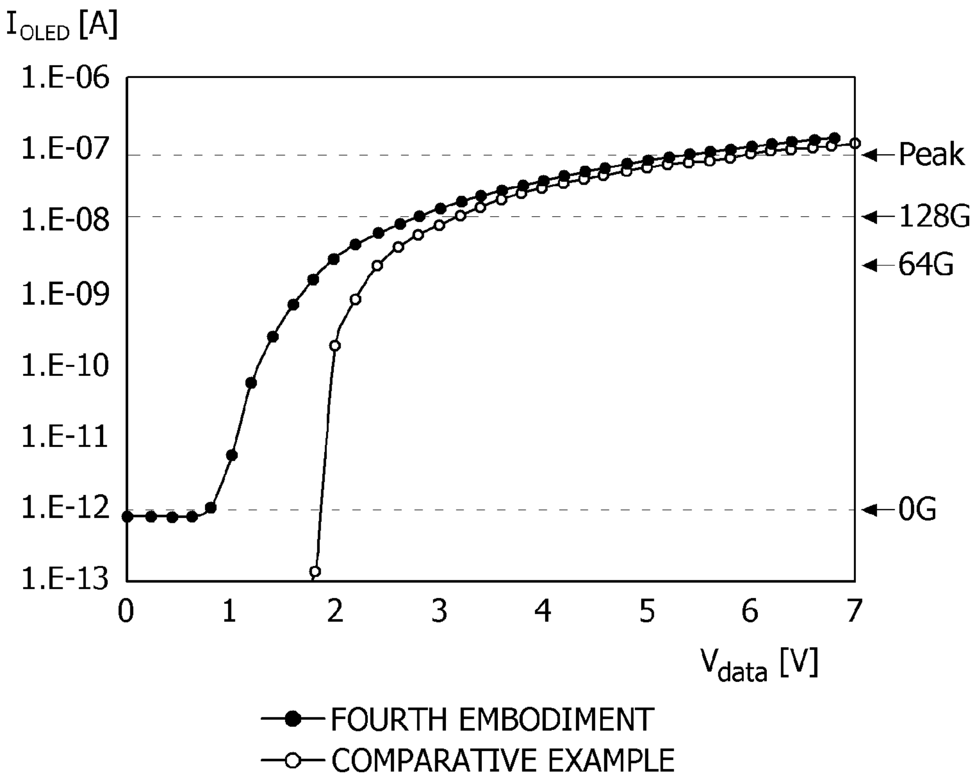
FIG. 17 is a diagram for comparing and describing a gamma curve changed by an initialization voltage.

FIGS. 16A and 16B are diagrams illustrating other driving timings of the pixel circuit shown in FIG. 13, and FIG. 17 is a diagram for comparing and describing a gamma curve changed by an initialization voltage.

Referring to FIGS. 16A and 16B, the pixel circuit according to the third embodiment of the present disclosure may operate in the order of an initialization operation Tini, a sensing operation Ts, a data writing operation Tw, an OBS operation Tobs, and a light-emitting operation Tem.

In the OBS operation Tobs, the initialization voltage Vinit is applied to the second node n2 so that the voltage of the second node n2 is reduced to the initialization voltage Vinit. The OBS operation Tobs is absolutely for an accurate luminance expression of the compensation circuit.

However, since the initialization voltage Vinit is too low, when the data voltage is low, it takes a lot of time for the voltage of the second node n2 to rise from the initialization voltage Vinit to the voltage which is a certain level above the low-potential power voltage EVSS to allow the light-emitting element to emit light so that the light-emitting element starts to emit light. This becomes a factor of lowering a luminance in a low grayscale.

Thus, in the embodiment, the initialization voltage Vinit is varied so that the voltage of the second node n2 can be increased in the OBS operation Tobs to selectively increase the luminance only in the low grayscale.

In a comparative example as shown in FIG. 16B, when the initialization voltage is low to −3 V and the data voltage is low, a very small current flows since Vgs is small, and the voltage of the second node n2 rises very slowly. Thus, since the light-emitting element may not emit light until the voltage of the second node n2 rises sufficiently, the luminance is reduced.

On the other hand, when a high voltage of +3 V is applied by varying the initialization voltage as shown in the third embodiment, the time taken for the voltage at the second node n2 to rise to the voltage at which the light-emitting element emits light is shortened, so the light-emitting element starts to emit light more quickly, and thus the luminance is increased.

When the data voltage is high, a sufficiently large current flows in the driving element and the voltage of the second node n2 rises quickly, so that the variation of the initialization voltage does not affect the luminance.

As such, in the embodiment, when the initialization voltage of −3 V is applied and then increased to +3V in the OBS operation Tobs, the current $I_{OLED}$ at the low data voltage rises while the current $I_{OLED}$ at the high data voltage remains unchanged, so that gamma characteristics at the low grayscale are improved.

Referring to FIG. 17, in the third embodiment, since the gate-source voltage Vgs of the driving element DT is reduced, the current $I_{OLED}$ flowing through the driving element DT is reduced.

When a gamma curve in a case, in which the pixel circuit with a variable initialization voltage is used as in the third embodiment, is compared with a gamma curve in a case, in which a pixel circuit without a variable initialization voltage is used as in a comparative example, it can be seen that a slope of the gamma curve is reduced in a low grayscale.

When the slope of the gamma curve is reduced in the low grayscale, the low grayscale expression may be facilitated.

The case of varying the initialization voltage in the pixel circuit of the third embodiment is described here as an example, but the present disclosure is not necessarily limited thereto, and, it may also be possible to apply the configuration of varying the initialization voltage to the pixel circuit of the first embodiment and the pixel circuit of the second embodiment.

Figure 18:
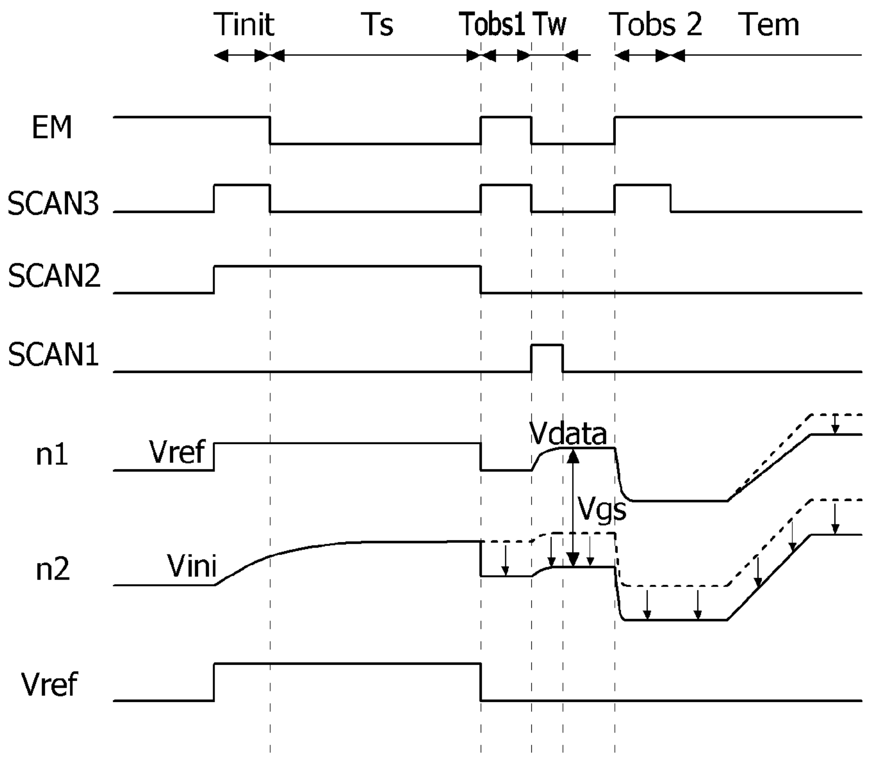
FIG. 18 is a diagram illustrating other driving timings of the pixel circuit shown FIG. 13.
Figure 19A:
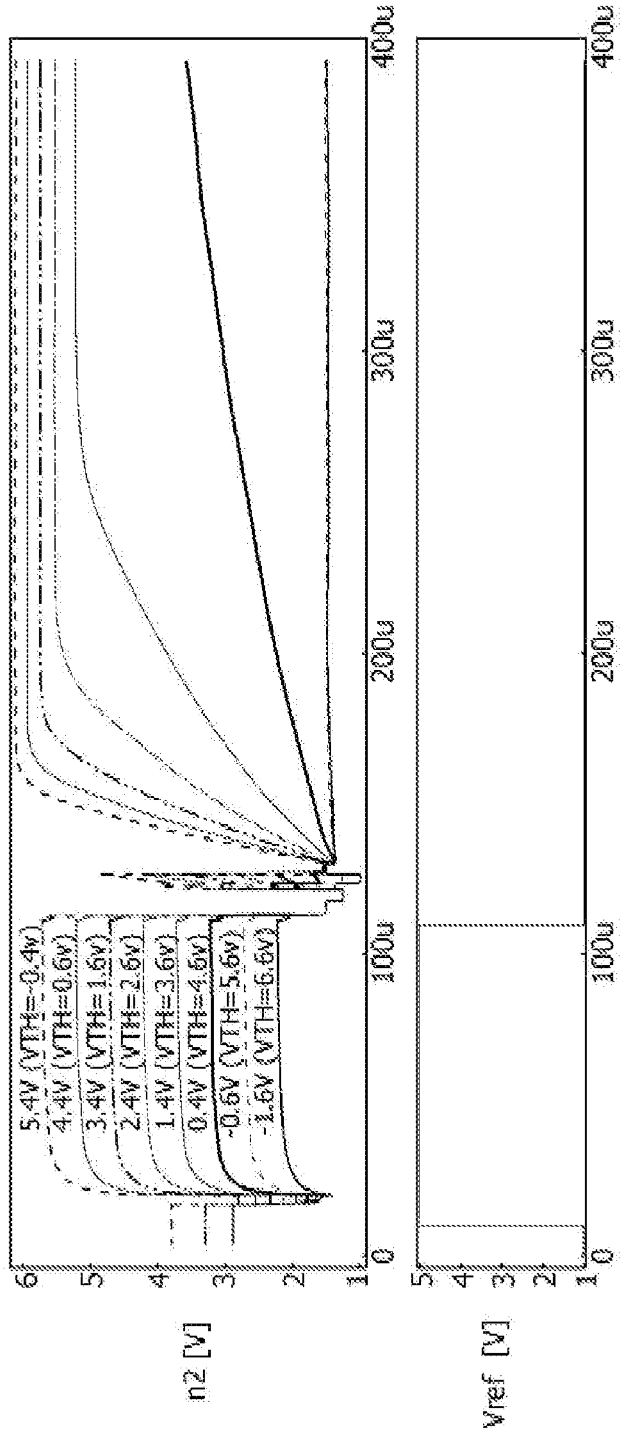
FIGS. 19A and 19B are diagrams for describing an operation according to the variation of a reference voltage.
Figure 19B:
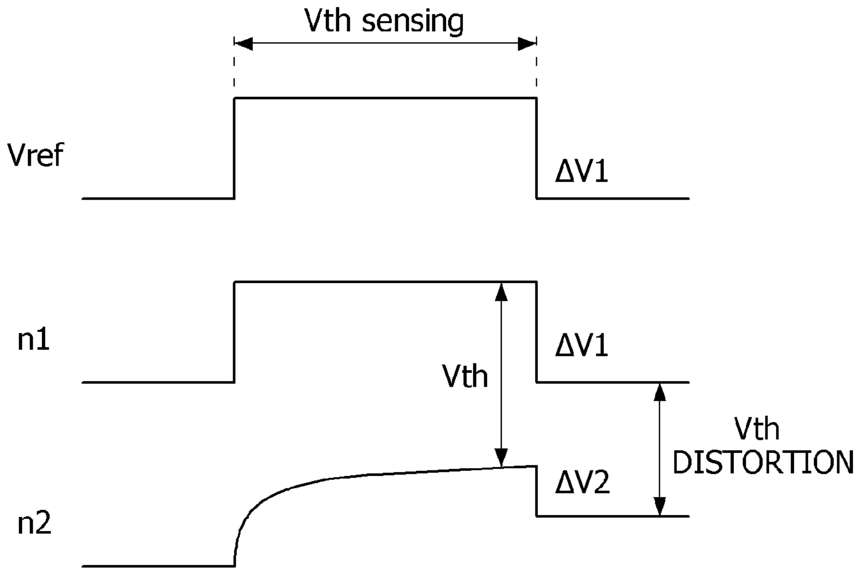

FIG. 18 is a diagram illustrating other driving timings of the pixel circuit shown FIG. 13, and FIGS. 19A and 19B are diagrams for describing an operation according to the variation of a reference voltage.

Referring to FIG. 18, the pixel circuit according to the fourth embodiment of the present disclosure may sense the threshold voltage Vth of the driving element DT through an internal compensation circuit. At this time, the pixel circuit according to the fourth embodiment may operate in the order of an initialization operation Tini, a sensing operation Ts, a first OBS operation Tobs1, a data writing operation Tw, a second OBS operation Tobs2, and a light-emitting operation Tem.

In the sensing operation Ts, the driving element DT is turned off when Vgs=Vth, and Vgs, at this time, is stored in the first capacitor Cst to compensate for the threshold voltage Vth. In the first OBS operation Tobs1, the third switch element M03 and the fourth switch element M04 are turned on.

The threshold voltage Vth may be sensed only in the range between the reference voltage Vref and the initialization voltage Vinit, and when the threshold voltage Vth is out of this range, sensing of the threshold voltage Vth becomes impossible, which results in inaccurate grayscale expression. Thus, in the embodiment, a sensing range of the threshold voltage Vth may be expanded by varying the reference voltage Vref.

In this case, the reference voltage Vref is varied to expand the sensible range of the threshold voltage Vth without side-effects, such that the reference voltage is increased only during the sensing operation to sense a wider range of the threshold voltage and then returned to the original voltage.

As shown in FIG. 19A, in the embodiment, when the reference voltage Vref is increased from 1 V to 5 V, voltages of the second node n2 according to the threshold voltages after sensing the threshold voltage Vth are shown.

As an example, in the case of (1), a voltage DTG of the first node n1 is 5 V, which is the reference voltage Vref, and a voltage DTS of the second node n2 after sensing the threshold voltage is 5.4 V, and thus, DTG−DTS=5 V−5.4

V=−0.4 V, which is the same as the actual threshold voltage Vth of −0.4 V. Thus, in the embodiment, it can be seen that sensing is normally performed when the threshold voltage is −0.4 V.

As another example, in the case of (6), the voltage DTG of the first node n1 is 5 V, which is the reference voltage Vref, and the voltage DTS of the second node n2 after sensing the threshold voltage is −1.6 V, and thus, DTG−DTS=5 V−(−1.6 V)=6.6 V, which is the same as the actual threshold voltage Vth of 6.6 V. Thus, in the embodiment, it can be seen that sensing is normally performed when the threshold voltage is 6.6 V.

Referring to FIG. 19B, after sensing the threshold voltage, the voltage DTG of the first node n1 and the voltage DTS of the second node n2 should be lowered again. The reason for this is that when the voltage DTG of the first node n1 is maintained to be high, the power consumption will increase since the data voltage must be input based on this voltage.

However, even when the reference voltage Vref is lowered to the original voltage, the drop of the voltage DTS of the second node n2 relative to the voltage DTG of the first node n1 is reduced due to the principle of voltage distribution of the first capacitor Cst and the second capacitor C2, which distorts the threshold voltage.

That is, the voltage of the first node n1 is lowered by ΔV1, which is the voltage by which the reference voltage is lowered, but the voltage of the second node n2 is lowered by ΔV2=ΔV1×((Cst/(Cst+C2)).

Accordingly, in the embodiment, the first OBS operation Tobs1 for lowering the voltage DTG of the first node n1 and the voltage DTS of the second node n2 is performed before the data writing operation Tw, so that the voltage can be lowered without being affected by the voltage distribution principle of the capacitors.

The case of varying the reference voltage in the pixel circuit of the fourth embodiment is described here as an example, but the present disclosure is not necessarily limited thereto, and it may also be possible to apply the configuration of varying the reference voltage to the pixel circuit of the first embodiment and the pixel circuit of the second embodiment.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pixel circuit, comprising:

a driving element including a first electrode connected to a pixel driving voltage line, a gate electrode connected to a first node, and a second electrode connected to a second node;

a first switch element configured to supply a data voltage to the first node in response to a first gate signal;

a second switch element configured to supply a reference voltage to the first node in response to a second gate signal;

a third switch element configured to supply an initialization voltage to a third node in response to a third gate signal;

a fourth switch element configured to connect the second node and the third node in response to a fourth gate signal;

a first capacitor having a first electrode connected to the first node and a second electrode connected to the second node;

a second capacitor having a first electrode connected to the pixel driving voltage line and a second electrode connected to the second node;

a third capacitor having a first electrode connected to a gate electrode of the second switch element and a second electrode connected to the second node; and a light-emitting element having a first electrode connected to the third node and a second electrode connected to a low-potential power voltage line.

2. The pixel circuit of claim 1, further comprising a fourth capacitor first electrode connected to the pixel driving voltage line and a second electrode connected to the first node.

3. The pixel circuit of claim 2, wherein the first switch element includes a gate electrode to which the first gate signal is applied, a first electrode connected to a data voltage line through which the data voltage is applied, and a second electrode connected to the first node, the second switch element includes the gate electrode to which the second gate signal is applied, a first electrode connected to a reference voltage line through which the reference voltage is applied, and a second electrode connected to the first node, the third switch element includes a gate electrode to which the third gate signal is applied, a first electrode connected to the third node, and a second electrode connected to an initialization voltage line through which the initialization voltage is applied, and the fourth switch element includes a gate electrode to which the fourth gate signal is applied, a first electrode connected to the second node, and a second electrode connected to the third node.

4. The pixel circuit of claim 3, wherein the pixel circuit operates in the order of an initialization operation, a sensing operation, a data writing operation, a second on-bias stress (OBS) operation, and a light-emitting operation, wherein in the initialization operation and the sensing operation, the second switch element is turned on by the second gate signal, and a voltage of the second node is lowered at a falling time of the second gate signal by the third capacitor.

5. The pixel circuit of claim 4, wherein in the light-emitting operation, the voltage of the second node is increased by a pixel driving voltage applied through the pixel driving voltage line, and an increase in voltage of the first node is reduced by the fourth capacitor.

6. The pixel circuit of claim 5, wherein in the light-emitting operation, the voltage of the second node drops to the initialization voltage and then gradually rises by receiving a current due to the pixel driving voltage.

7. The pixel circuit of claim 4, wherein in the second OBS operation, the third switch element and the fourth switch element are turned on, and the initialization voltage is varied to a predetermined level.

8. The pixel circuit of claim 4, wherein in the sensing operation, the reference voltage is varied to a predetermined level.

9. The pixel circuit of claim 8, further including a first OBS operation before the data writing operation, wherein in the first OBS operation, the third switch element and the fourth switch element are turned on.

10. The pixel circuit of claim 4, wherein in the data writing operation, the first switch element is turned on, and the data voltage is applied to the first node.

11. The pixel circuit of claim 2, wherein the fourth capacitor is formed by overlapping a portion of a gate electrode the driving element and a drain electrode of the driving element, to which a pixel driving voltage applied through the pixel driving voltage line is applied.

12. The pixel circuit of claim 1, wherein the third capacitor is formed by overlapping of a portion of a gate electrode of the driving element and a gate electrode of the second switch element, to which the second gate signal is applied.

13. A pixel circuit, comprising:

a driving element including a first electrode connected to a pixel driving voltage line, a gate electrode connected to a first node, and a second electrode connected to a second node;

a first switch element configured to supply a data voltage to the first node in response to a first gate signal;

a second switch element configured to supply a reference voltage to the first node in response to a second gate signal;

a third switch element configured to supply an initialization voltage to a third node in response to a third gate signal;

a fourth switch element configured to connect the second node and the third node in response to a fourth gate signal;

a first capacitor having a first electrode connected to the first node and a second electrode connected to the second node;

a second capacitor having a first electrode connected to the pixel driving voltage line and a second electrode connected to the second node;

a fourth capacitor having a first electrode connected to the pixel driving voltage line and a second electrode connected to the first node; and a light-emitting element first electrode connected to the third node and a second electrode connected to a low-potential power voltage line.

14. The pixel circuit of claim 13, wherein the first switch element includes a gate electrode to which the first gate signal is applied, a first electrode connected to a data voltage line through which the data voltage is applied, and a second electrode connected to the first node, the second switch element includes a gate electrode to which the second gate signal is applied, a first electrode connected to a reference voltage line through which the reference voltage is applied, and a second electrode connected to the first node, the third switch element includes a gate electrode to which the third gate signal is applied, a first electrode connected to the third node, and a second electrode connected to an initialization voltage line through which the initialization voltage is applied, and the fourth switch element includes a gate electrode to which the fourth gate signal is applied, a first electrode connected to the second node, and a second electrode connected to the third node.

15. A display device, comprising a display panel in which a plurality of data lines, a plurality of gate lines intersecting the data lines, a plurality of power lines through which different voltages are applied, and a plurality of pixel circuits are disposed, wherein each of the plurality of pixel circuits includes:

a driving element including a first electrode connected to a pixel driving voltage line, a gate electrode connected to a first node, and a second electrode connected to a second node;

a first switch element configured to supply a data voltage to the first node in response to a first gate signal (SCAN1);

a second switch element configured to supply a reference voltage to the first node in response to a second gate signal (SCAN2);

a third switch element configured to supply an initialization voltage to a third node in response to a third gate signal (SCAN3);

a fourth switch element configured to connect the second node and the third node in response to a fourth gate signal (EM);

a first capacitor connected between the first node and the second node;

a second capacitor connected between the pixel driving voltage line and the second node;

a third capacitor connected between a gate electrode of the second switch element and the second node; and a light-emitting element connected between the third node and a low-potential power voltage line.

16. The display device of claim 15, further comprising a fourth capacitor connected between the pixel driving voltage line and the first node.

17. The display device of claim 16, wherein the first switch element includes a gate electrode to which the first gate signal is applied, a first electrode connected to a data voltage line through which the data voltage is applied, and a second electrode connected to the first node, the second switch element includes the gate electrode to which the second gate signal is applied, a first electrode connected to a reference voltage line through which the reference voltage is applied, and a second electrode connected to the first node, the third switch element includes a gate electrode to which the third gate signal is applied, a first electrode connected to the third node, and a second electrode connected to an initialization voltage line through which the initialization voltage is applied, and the fourth switch element includes a gate electrode to which the fourth gate signal is applied, a first electrode connected to the second node, and a second electrode connected to the third node.

18. The display device of claim 17, wherein the pixel circuit operates in the order of an initialization operation, a sensing operation, a data writing operation, a second OBS operation, and a light-emitting operation, wherein in the initialization operation and the sensing operation, the second switch element is turned on by the second gate signal, and a voltage of the second node is lowered at a falling time of the second gate signal by the third capacitor.

19. The display device of claim 18, wherein in the light-emitting operation, the voltage of the second node is increased by a pixel driving voltage applied through the pixel driving voltage line, and an increase in voltage of the first node is reduced by the fourth capacitor.

20. The display device of claim 18, wherein in the second OBS operation, the third switch element and the fourth switch element are turned on, and the initialization voltage is varied to a predetermined level.

* * * * *